US012630750B2

(12) United States Patent　(10) Patent No.: US 12,630,750 B2
Coffey et al.　(45) Date of Patent: May 19, 2026

(54) ADHESIVE COMPOSITIONS

(71) Applicant: ExxonMobil Technology and Engineering Company, Annandale, NJ (US)

(72) Inventors: James N. Coffey, League City, TX (US); Jennifer J. Austin, The Woodlands, TX (US); Madelyn Bekker, Houston, TX (US); Adam P. Hamilton, Houston, TX (US); Ronald G. White, Deer Park, TX (US); Paul Hamilton, Hampshire (GB)

(73) Assignee: ExxonMobil Technology and Engineering Company, Spring, TX (US)

( * ) Notice: Subject to any disclaimer, the term of this patent is extended or adjusted under 35 U.S.C. 154(b) by 746 days.

(21) Appl. No.: 17/756,363

(22) PCT Filed: Nov. 10, 2020

(86) PCT No.: PCT/US2020/059779
§ 371 (c)(1),
(2) Date: May 24, 2022

(87) PCT Pub. No.: WO2021/113026
PCT Pub. Date: Jun. 10, 2021

(65) Prior Publication Data
US 2023/0046550 A1　Feb. 16, 2023

Related U.S. Application Data

(60) Provisional application No. 62/943,298, filed on Dec. 4, 2019.

(51) Int. Cl.
*C09J 123/08* (2006.01)

(52) U.S. Cl.
CPC ............................... *C09J 123/0853* (2013.01)

(58) Field of Classification Search
CPC ......................... C09J 123/0853; C09J 123/08
See application file for complete search history.

(56) References Cited

U.S. PATENT DOCUMENTS

| | | | |
|---|---|---|---|
| 2,007,983 A | 7/1935 | Rosenblum et al. | |
| 3,449,273 A | 6/1969 | Kettenring et al. | |
| 4,078,132 A | 3/1978 | Lepert | |
| 4,148,775 A | 4/1979 | Shima et al. | |
| 4,345,349 A * | 8/1982 | Flanagan | C09J 131/04 |
| | | | 524/505 |
| 4,775,719 A | 10/1988 | Markevka et al. | |
| 4,808,255 A | 2/1989 | Markevka et al. | |
| 4,820,368 A | 4/1989 | Markevka et al. | |
| 5,171,793 A | 12/1992 | Johnson et al. | |
| 5,441,808 A | 8/1995 | Anderson et al. | |
| 5,571,867 A | 11/1996 | Luvinh et al. | |
| 6,207,748 B1 | 3/2001 | Tse et al. | |
| 7,001,957 B2 | 2/2006 | McBride | |
| 7,148,284 B2 * | 12/2006 | Morrison | C09J 123/0853 |
| | | | 524/487 |
| 7,148,844 B2 | 12/2006 | Salkhi | |
| 7,341,619 B2 | 3/2008 | Yang et al. | |
| 7,524,910 B2 | 4/2009 | Jiang et al. | |
| 8,193,289 B2 | 6/2012 | Abhari et al. | |
| 8,431,232 B2 | 4/2013 | Shelby et al. | |
| 10,294,357 B2 | 5/2019 | Schauder et al. | |
| 2005/0143502 A1 * | 6/2005 | Yamada | C08K 5/0008 |
| | | | 524/492 |
| 2009/0203847 A1 * | 8/2009 | Ellis | C08L 23/10 |
| | | | 525/240 |
| 2015/0112014 A1 * | 4/2015 | Tripathy | C09J 123/10 |
| | | | 524/528 |

FOREIGN PATENT DOCUMENTS

| | | |
|---|---|---|
| EP | 0078122 B1 | 1/1989 |
| EP | 0492824 A2 | 7/1992 |
| EP | 0455400 B1 | 8/1995 |
| EP | 0668302 B1 | 10/2011 |
| WO | 1991/007472 A1 | 5/1991 |

OTHER PUBLICATIONS

Chevron product data sheet downloaded on Apr. 19, 2025.*
QChem product data sheet downloaded on Apr. 19, 2025.*
DuPont Elvax® 205W Ethylene Vinyl Acetate product data sheet downloaded on Apr. 19, 2025.*
Product data sheet downloaded on Sep. 9, 2025.*
International Search Report and Written Opinion for Application No. PCT/US2020/059779 dated Jan. 2, 2021.
Academic Press, Inc., Bernhard Wunderlich, Macromolecular Physics, vol. 1, p. 388, Crystal Structure, 1973.

* cited by examiner

*Primary Examiner* — Kumar R Bhushan

(74) *Attorney, Agent, or Firm* — C. Tumey Law Group PLLC

(57) ABSTRACT

Embodiments of the present disclosure generally relate to adhesive compositions, and more particularly, to the use of polyolefin adhesive compositions for hot melt adhesive applications. In an embodiment, a composition includes a polymer, a resin, and an olefin wax. In an embodiment, an olefin wax may be a linear alpha olefin.

27 Claims, No Drawings

ADHESIVE COMPOSITIONS

CROSS-REFERENCE TO RELATED APPLICATIONS

This application is the 35 USC § 371 National Stage Application for PCT Application Number PCT/US2020/059779 filed on Nov. 10, 2020 which claims the benefit of U.S. Provisional Application No. 62/943,298 filed on Dec. 4, 2019, the entire contents of both of which are incorporated herein by reference.

FIELD

Embodiments of the present disclosure generally relate to adhesive compositions including an olefin wax.

BACKGROUND

A hot melt adhesive (HMA) is a thermoplastic polymer system that can be applied to a substrate in a molten state and then placed in contact with one or more other substrates. Upon cooling and solidifying, the hot melt adhesive forms a bond between the substrates. Hot melt adhesives are used extensively in the packaging industry, e.g., to seal and close cartons or to laminate multilayer papers, and accordingly, the industry continues to search for adhesive compositions having a balance of certain properties such as set time, bonding strength, cohesive strength, fiber tear value, and low viscosity.

The hot melt adhesive should have good adhesion over a wide temperature range, e.g., at low temperatures for packaging applications in the frozen-goods sector, and a low viscosity melt to facilitate application to the substrate, especially for automatic processing. The hot melt adhesive should have, on the one hand, a moderate to long open time, defined as the time span between adhesive application to a first substrate and assembly of the parts to be joined. On the other hand, a fast set time is typically required to quickly build up bond strength on fast-running packaging machines. The set time is the time needed for the hot melt adhesive to solidify to the point where it possesses enough bond strength to form bonds to give substrate fiber tear when pulled apart, e.g., at a time when the bond is sufficiently strong such that sealed substrates will not pop open upon exit from the compression section on a packaging line. The bond may continue to build additional strength upon further cooling.

Generally, the use of a specific adhesive is a matter of trading off one property for another, for example, an adhesive that exhibits a low viscosity during set time typically has a low fiber tear value. Indeed, it is challenging to obtain the desired balance among set time, bonding strength, and low viscosity. Conventional hot melt adhesives are optimized either for good adhesion, while sacrificing set time, or for a fast set time, while sacrificing adhesion at low temperatures.

SUMMARY

In an embodiment, the present disclosure is directed to a composition includes a polymer, a resin, and an olefin wax.

In another embodiment, a composition includes from about 10 wt % to about 50 wt % of a polymer, based on the total weight of the composition. The composition includes from about 20 wt % to about 70 wt % of a resin, based on the total weight of the composition. The composition includes from about 1 wt % to about 50 wt % of wax comprising an olefin wax, based on the total weight of the composition. In another embodiment, a composition comprises: from about 10 wt % to about 50 wt % of a polymer, based on the total weight of the composition; from about 20 wt % to about 70 wt % of a resin, based on the total weight of the composition; and from about 1 wt % to about 50 wt % of a wax blend comprising (a) an olefin wax and (b) an additional wax, based on the total weight of the composition, wherein the total amount of polymer, resin, and wax does not exceed 100% of the composition.

In another embodiment, an article includes a composition disposed thereon. The composition has a polymer, a resin, and an olefin wax.

In another embodiment, an article includes a composition disposed thereon. The composition has from about 10 wt % to about 50 wt % of a polymer, based on the total weight of the composition. The composition has from about 20 wt % to about 70 wt % of a resin, based on the total weight of the composition. The composition has from about 1 wt % to about 50 wt % of wax comprising an olefin wax, based on the total weight of the composition.

In another embodiment, a method of making a composition includes mixing a polymer, a resin, and an olefin wax to form the composition.

In another embodiment, a method includes applying a hot melt adhesive comprising an olefin wax to a first article to form an article having the hot melt adhesive disposed thereon. The method includes applying a second article to the article having the hot melt adhesive disposed thereon.

DETAILED DESCRIPTION

The present inventors recognized a need for and unexpectedly discovered adhesive compositions having advantageous processing properties, such as increased fiber tear while maintaining low viscosity during set time. Embodiments of the present disclosure generally relate to compositions, such as adhesive compositions, for example, hot melt adhesive composition, that comprise an olefin wax. In various embodiments, the present invention provides compositions comprising a polymer, a resin, and a wax. The wax may be or include an olefin wax, such as a linear alpha olefin wax. The present inventors unexpectedly discovered compositions including an olefin wax, such as a linear alpha olefin, that provide increased fiber tear while maintaining low viscosity during set time. Compositions of the present disclosure may be used as hot melt adhesives.

Compositions

Compositions of the present disclosure may include from about 10 wt % to about 50 wt % of polymer, such as from about 20 wt % to about 40 wt %, such as from about 25 wt % to about 30 wt %, based on the total weight of the composition. Compositions of the present disclosure may include from about 20 wt % to about 70 wt % of resin, such as from about 30 wt % to about 60 wt %, such as from about 35 wt % to about 50 wt %, based on the total weight of the composition. Compositions of the present disclosure may include from about 1 wt % to about 50 wt % of wax, such as from about 5 wt % to about 40 wt %, such as from about 10 wt % to about 35 wt %, such as from about 15 wt % to about 30 wt %, based on the total weight of the composition.

As used herein, a "composition" can include component(s) of the composition and/or reaction product(s) of two or more components of the composition. Compositions of the present disclosure can be prepared by any suitable mixing process. Mixing can be performed by dry blending or extruding a mixture of the various components of the composition, such as by a masterbatch technique. Compositions can be prepared by blending the components using conventional masticating equipment, for example, a rubber mill, Brabender Mixer, Banbury Mixer, Buss-Ko Kneader, Farrel continuous mixer or twin-screw continuous mixer in the melt, e.g. at a temperature from about 130° C. to about 210° C., until a homogeneous blend is obtained. Mixing temperatures may depend on the particular composition being formed, with about 150° C. to about 160° C. typically being a suitable range. Other embodiments use mixing temperatures of from about 130° C. to about 160° C.; about 130° C. to about 200° C.; about 150° C. to about 160° C.; or about 150° C. to about 200° C.

Waxes

According to various embodiments, waxes of the present disclosure are or include an olefin wax and optionally an additional wax. In some embodiments, compositions of the present disclosure include from about 1 wt % to about 50 wt % of wax (e.g., a wax content of olefin wax+optional additional wax), such as from about 5 wt % to about 40 wt %, such as from about 10 wt % to about 35 wt %, such as from about 15 wt % to about 30 wt %, based on the total weight of the composition.

In various embodiments, the olefin wax includes olefins and/or alpha olefins with carbon number distributions, alpha olefin contents, and molecular weight distributions, as described herein.

In some embodiments, olefin wax is any composition including an olefin having at least about 10 carbon atoms, such as at least about 20 carbon atoms, such as from about 20 carbon atoms to about 50 carbon atoms. Generally, an olefin is a hydrocarbon with at least one carbon-carbon double bond. In some embodiments, the olefin wax includes an alpha olefin. An alpha olefin is a hydrocarbon with a carbon-carbon double bond at a terminal position. In at least one embodiment, the olefin wax includes an internal olefin. In some embodiments, the olefin wax includes linear internal olefins. In some embodiments, the olefin wax includes a linear alpha olefin. A linear alpha olefin is an alpha olefin having a straight chain of carbon atoms (e.g., no carbon chain branches) and a carbon-carbon double bond at the terminal position.

The olefin wax may have an olefin content of about 10% or less, based on olefinic carbon atoms divided by total carbon atoms as determined by $^{13}C$ NMR, such as from about 0.1% to about 10%, such as from about 1% to about 8%, such as from about 1% to about 6%, such as from about 2% to about 4%.

Olefin content of olefin waxes of the present disclosure can be determined using $^{13}C$ NMR by dissolving an olefin wax in deuterated 1,1,2,2-tetrachloroethane (tce-d2) at a concentration of 67 mg/mL at 140° C. Spectra can be recorded at 120° C. using a Bruker NMR spectrometer of at least 600 MHz with a 10 mm cryoprobe. A 90° pulse, 10 s delay, 512 transients, and gated decoupling can be used for measuring the $^{13}C$ NMR spectra. Resonance peaks are referenced to Polyethylene main peak at 29.98 ppm. Calculations involved in the characterization of polymers by NMR follow the work of J. Randall in "Polymer Sequence Determination, $^{13}C$-NMR Method", Academic Press, New York, 1977 and Frank Bovey et.al. Macromolecules, 9, 1976 (76-80).

The olefin wax may include one or more olefins. Compositions may include one or more additional waxes, as described in more detail below. In at least one embodiment, a wax of the present disclosure includes greater than about 30 mol % olefin wax (e.g., olefin-containing molecules)

having at least about 20 carbon atoms, based on the total amount of wax in the composition, such as greater than about 45 mol % olefin wax having at least about 20 carbon atoms, such as greater than about 60 mol % olefin wax having at least about 20 carbon atoms, such as greater than about 75 mol % olefin wax having at least about 20 carbon atoms, such as greater than about 90 mol % olefins having at least about 20 carbon atoms, such as greater than about 95 mol % olefins having at least about 20 carbon atoms.

In some embodiments, the olefin wax includes alpha olefins. In at least one embodiment, the wax includes greater than about 30 mol % alpha olefins having at least about 20 carbon atoms, based on the total amount of wax (olefin wax+optional additional wax) in the composition, such as greater than about 45 mol % alpha olefins having at least about 20 carbon atoms, such as greater than about 60 mol % alpha olefins having at least about 20 carbon atoms, such as greater than about 75 mol % alpha olefins having at least about 20 carbon atoms, such as greater than about 90 mol % alpha olefins having at least about 20 carbon atoms, such as greater than about 95 mol % alpha olefins having at least about 20 carbon atoms.

In at least one embodiment, the olefin wax includes greater than about 70 wt % olefins having from about 20 to about 24 carbon atoms, based on the total amount of olefin wax in the composition, such as greater than about 80 wt % olefins having from about 20 to about 24 carbon atoms, such as greater than about 85 wt % percent olefins having from about 20 to about 24 carbon atoms, such as greater than about 90 wt % olefins having from about 20 to about 24 carbon atoms, such as greater than about 95 wt % olefins having from about 20 to about 24 carbon atoms.

In at least one embodiment, the olefin wax includes greater than about 50 wt % olefins having from about 24 to about 28 carbon atoms, based on the total amount of olefin wax in the composition, such as greater than about 60 wt % olefins having from about 24 to about 28 carbon atoms, such as greater than about 70 wt % olefins having from about 24 to about 28 carbon atoms, such as greater than about 80 wt % olefins having from about 24 to about 28 carbon atoms, such as greater than about 90 wt % olefins having from about 24 to about 28 carbon atoms.

In at least one embodiment, the olefin wax includes greater than about 50 wt % olefins having from about 26 to about 28 carbon atoms, based on the total amount of olefin wax in the composition, such as greater than about 60 wt % olefins having from about 26 to about 28 carbon atoms, such as greater than about 70 wt % olefins having from about 26 to about 28 carbon atoms, such as greater than about 80 wt % olefins having from about 26 to about 28 carbon atoms, such as greater than about 90 wt % olefins having from about 26 to about 28 carbon atoms.

In at least one embodiment, the olefin wax includes greater than about 70 wt % olefins having at least about 30 carbon atoms, based on the total amount of olefin wax in the composition, such as greater than about 80 wt % olefins having at least about 30 carbon atoms, such as greater than about 85 wt % percent olefins having at least about 30 carbon atoms, such as greater than about 90 wt % olefins having at least about 30 carbon atoms, such as greater than about 95 wt % olefins having at least about 30 carbon atoms.

Alternatively, the olefin wax may be described as an olefin wax having an average molecular weight (Mw, as measured by gel permeation chromatography (GPC)) of the olefin components thereof. In some embodiments, the olefin wax has an average molecular weight greater than about 260 grams/mole, such as greater than about 330 grams/mole, such as greater than about 400 grams/mole, such as from about 260 grams/mole to about 340 grams/mole, such as from about 280 grams/mole to about 320 grams/mole, such as from about 290 grams/mole to about 310 grams/mole, alternatively from about 330 grams/mole to about 420 grams/mole, such as from about 350 grams/mole to about 400 grams/mole, such as from about 360 grams/mole to about 390 grams/mole, alternatively from about 440 grams/mole to about 550 grams/mole, such as from about 460 grams/mole to about 530 grams/mole, such as from about 480 grams/mole to about 510 grams/mole.

Commercially available olefin waxes can contain a number of alpha olefins having at least about 20 carbon atoms, alpha olefins having at least about 25 carbon atoms, as well as other compounds (smaller alpha olefins, internal olefins, vinylidene, or others). One source of commercially available alpha olefin waxes is ExxonMobil Chemical Company, Baytown, Texas.

In at least one embodiment, the olefin wax includes one or more of: (1) an olefin having from about 20 carbon atoms to about 24 carbon atoms, (2) an olefin having from about 26 carbon atoms to about 28 carbon atoms, (3) an olefin having from about 26 to about 28 carbon atoms, and/or (4) an olefin having from having at least about 30 carbon atoms.

Commercially available olefin waxes may further include vinylidene or internal olefins, up to about 50 wt % of the wax. In at least one embodiment, and regardless of the number of carbons in the olefin, the olefin wax is an alpha olefin having high alpha olefin content (of total olefins), known as a high alpha olefin (HA) AO wax. By "HA wax" is meant a wax including (a) one or more alpha olefins and (b) less than about 20 wt % (vinylidene+internal olefins).

Independently, commercially available olefin waxes may further include non-olefin hydrocarbons, such as paraffins (hydrocarbons wherein all bonds between carbon atoms are single bonds). In various embodiments, other components known in the art to acceptably be present in olefin waxes are present as well.

In some embodiments, olefin waxes include olefin streams from ethylene oligomerization, cracked heavy waxes (e.g. Fischer-Tropsch waxes), and/or mixtures of paraffins and olefins, among others.

In some embodiments, the olefin wax includes commercially available normal alpha olefin waxes. One source of commercially available alpha olefin waxes is ExxonMobil Chemical Company, Baytown, Texas.

In various embodiments, olefin waxes of the present disclosure have one or more of the following properties: (1) a congealing point of from about 45° C. to about 65° C., according to ASTM D938, such as from about 50° C. to about 62° C., such as from about 55° C. to about 60° C.; (2) a penetration @25° C. (0.1 mm, needle) according to ASTM D1321, of from about 15 to about 40, such as from about 20 to about 30, such as from about 22 to about 26; (3) a density @80° C. of from about 700 kg/m³ to about 900 kg/m³, according to ASTM D4052, such as from about 750 kg/m³ to about 850 kg/m³, such as from about 750 kg/m³ to about 800 kg/m³; (4) a kinematic viscosity @100° C. of from about 3 mm²/s to about 6 mm²/s, according to ASTM D445, such as from about 3.5 mm²/s to about 5.5 mm²/s, such as from about 4 mm²/s to about 4.5 mm²/s; and/or (5) a drop melting point of from about 15° C. to about 50° C., such as from about 25° C. to about 40° C., such as from about 30° C. to about 35° C., according to ASTM D3954. Commercially available linear alpha olefins can have a congealing point (ASTM D938) of 59° C.; penetration @25° C. (1/10 mm)(ASTM D1321) of 24; density @80° C. (ASTM D4052) of 777 kg/m³; kinematic viscosity @100° C. (ASTM D445) of 4.25 mm²/s. Commercially available linear alpha olefins can have a density of 791-793 kg/m³ @30° C.; a dynamic viscosity @37.8° C. of 10 cPs, and a melting point of 30° C.

Additional Waxes

Compositions of the present disclosure can optionally include an additional wax (e.g., a wax in addition to an olefin wax). Additional waxes can be used to modify the properties of a hot melt composition. Additional waxes can reduce the overall viscosity of the adhesive, thereby allowing it to liquefy more easily. The additional wax may also help control the open time, set time, and thermal stability of the system. In some embodiments, the additional wax may be included in a composition in an amount of at least about 0.1 wt %, at least about 2 wt %, or at least about 5 wt % of the total weight of the adhesive composition. Also, the additional wax may be present in the composition in an amount of up to about 10 wt %, about 20 wt %, about 25 wt %, about 30 wt %, about 35 wt %, about 40 wt %, or about 50 wt %, based on the total weight of the adhesive composition.

Suitable additional waxes can include paraffin waxes, microcrystalline waxes, high-density low molecular weight polyethylene waxes, by-product polyethylene waxes, Fischer-Tropsch waxes, oxidized Fischer-Tropsch waxes, and functionalized waxes such as hydroxy stearamide waxes and fatty amide waxes. Modified waxes, such as vinyl acetate-modified and maleic anhydride-modified waxes may also be used.

Fischer-Tropsch waxes may have one or more of the following properties: (1) a melting point (ASTM D 3954) of from about 90° C. to about 130° C., such as from about 100° C. to about 120° C., such as from about 110° C. to about 115° C., (2) penetration @25° C. (needle, 0.1 mm)(ASTM D 1321) of from about 0.1 to about 10, such as from about 0.5 to about 1.5; (3) penetration @65° C. (needle, 0.1 mm)(ASTM D 1321) of from about 10 to about 40, such as from about 15 to about 25; (4) a molecular weight (weight average molecular weight Mw) of from about 700 g/mole to about 1,000 g/mole, such as from about 800 g/mole to about 900 g/mole.

Fischer-Tropsch waxes may include Sasolwax H1 Fischer-Tropsch Hard Wax available from Sasol Performance Chemicals of Hamburg, Germany. Sasolwax H1 Fischer-Tropsch Hard Wax has a drop melting point of 112° C. (ASTM D3954), a Brookfield Viscosity at 135° C. of 8 cPs (Sasol 1010 method), and a molecular weight of 880 Dalton.

Paraffin waxes can have one or more of the following properties: (1) a drop melting point according to ASTM D3954 of from about 55° C. to about 75° C.; (2) penetration @25° C. (needle, 0.1 mm)(ASTM D 1321) of from about 8 to about 20, such as from about 10 to about 15; (3) penetration @40° C. (needle, 0.1 mm)(ASTM D 1321) of from about 20 to about 50, such as from about 30 to about 40; (4) kinematic viscosity @100° C. (ASTM D 445) of from about 1 cSt to about 10 cSt, such as from about 3 cSt to about 7 cSt; (5) density @15° C. (ASTM D 1298) of from about 700 kg/m³ to about 1,000 kg/m³, such as from about 800 kg/m³ to about 900 kg/m³.

Paraffin waxes may include PARVAN 1470 available from ExxonMobil Chemical Company, Baytown, TX. PARVAN 1470 has a melting point of about 63.3° C. (ASTM D87), kinematic viscosity @100° C. of 5.4 cSt (ASTM D445), and a density @15° C. of 826 kg/m³ (ASTM D1298).

Exemplary additional waxes have a drop melting point according to ASTM D3954 of from about 60° C. to about 68° C. and/or have an oil content of less than about 0.5 wt %, such as less than about 0.2 wt %.

Resins

Compositions include a resin (also referred to as a "tackifier"). Compositions of the present disclosure may include from about 20 wt % to about 70 wt % of resin, such as from about 25 wt % to about 65 wt %, such as from about 30 wt % to about 60 wt %, such as from about 35 wt % to about 55 wt %, such as from about 40 wt % to about 50 wt %, based on the total weight of the composition.

Resins may provide initial adhesion to differentiated substrates. Tack can be useful in a hot melt adhesive composition to allow for joining of articles before the heated adhesive hardens. Tackifiers can be added to give tack to the adhesive composition and also to lower the viscosity of the composition. The tackifiers can allow the composition to be more adhesive by improving wetting during the application. The presence of tackifiers can lower the resistance to deformation and facilitate bond formation on contact.

Examples of suitable resins can include aliphatic hydrocarbon resins, aromatic modified aliphatic hydrocarbon resins, cyclopentadiene resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic hydrocarbon resins, hydrogenated aliphatic aromatic resins, aromatic hydrocarbon resin, hydrogenated aromatic hydrocarbon resins, cycloaliphatic hydrocarbon resins, hydrogenated cycloaliphatic hydrocarbon resins, terpene-phenol resins, hydrogenated terpenes and modified terpenes, rosin acid resins, hydrogenated rosin acids, rosin ester resins, and hydrogenated rosin esters. In some embodiments the resin is hydrogenated. In some embodiments, the adhesive composition includes a combination of resins.

In some embodiments, the resin is non-polar, by which is meant that the resin is substantially free of monomers having polar groups. In some embodiments, the polar groups are not present, however if present, the polar groups can include not more than about 5 wt %, such as about 2 wt % or less, such as about 0.5 wt % or less, of the resin. In some embodiments, the resin has a softening point (Ring and Ball, as measured by ASTM E-28) of from about 80° C. to about 150° C., such as from about 100° C. to about 130° C. In some embodiments, the resin is liquid and has a ring and ball softening point of from about 10° C. and about 70° C.

Examples of hydrocarbon resins for use as resins can include:

(a) Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins, or mixtures thereof. Additional resins can include those described in WO 91/07472, U.S. Pat. Nos. 5,571,867, 5,171,793 and 4,078,132. Typically these resins are obtained from the cationic polymerization of compositions containing one or more of the following monomers: C5 diolefins (such as 1-3 pentadiene, isoprene, etc.); C5 olefins (such as 2-methyl-butenes, cyclopentene, etc.); C6 olefins (such as hexene), C9 vinylaromatics (such as styrene, alpha methyl styrene, vinyltoluene, indene, methyl indene, etc.); cyclics (such as dicyclopentadiene, methyldicyclopentadiene, etc.); and/or terpenes (such as limonene, carene, etc).

(b) Resins obtained by the thermal polymerization of dicyclopentadiene, and/or the thermal polymerization of dimers or oligomers of cyclopentadiene and/or methylcy-clopentadiene, optionally with vinylaromatics (such as styrene, alpha-methyl styrene, vinyl toluene, indene, methyl indene).

In some embodiments, the hydrocarbon resin has a total dicyclopentadiene, cyclopentadiene, and methylcyclopentadiene derived content of from about 60 wt % to about 100 wt % of the total weight of the hydrocarbon resin and wherein the hydrocarbon resin has a weight average molecular weight of from about 600 g/mol to about 1400 g/mol.

Suitable commercially available tackifiers may include ESCOREZ™ 1000, 2000 and 5000 series hydrocarbon resins (such as ESCOREZ™ E5400 or E5615), ECR-373, OPPERA™ PR 100, 101, 102, 103, 104, 105, 106, 111, 112, 115, and 120, available from ExxonMobil Chemical Company, ARKON™ M series, ARKON™ P series, and SUPER ESTER™ rosin esters available from Arakawa Chemical Company of Japan, SYLVARES™ phenol modified styrene-α methyl styrene resins, styrenated terpene resins, ZONATAC™ terpene-aromatic resins, and terpene phenolic resins available from Arizona Chemical Company of Jacksonville, Fla., SYLVATAC™ and SYLVALITE™ rosin esters available from Arizona Chemical Company, NOR-SOLENE™ aliphatic aromatic resins available from Cray Valley of France, DERTOPHENE™ terpene phenolic resins available from DRT Chemical Company of Landes, France, EASTOTAC™ resins, PICCOTAC™ C5/C9 resins, REGALITE™ and REGALREZ™ aromatic, and REGALITE™ cycloaliphatic/aromatic resins available from Eastman Chemical Company of Kingsport, Term., WING-TACKT™ resins available from Goodyear Chemical Company of Akron, Ohio, FORAL™, PENTALYN™, and PER-MALYN™ rosins and rosin esters available from Eastman Chemical Company, QUINTONE™ acid modified C5 resins, C5/C9 resins, and acid modified C5/C9 resins available from Nippon Zeon of Japan, and LX™ mixed aromatic/cycloaliphatic resins available from Neville Chemical Company of Pittsburgh, Pa., CLEARON™ hydrogenated terpene aromatic resins available from Yasuhara Chemical of Japan.

A class of resins that can be employed is the coumarone-indene resins, such as the para-coumarone-indene resins. Generally the coumarone-indene resins that can be employed have a molecular weight (Mw) that ranges from about 500 g/mol to about 5,000 g/mol. Non-limiting examples of resins of this type that are available commercially include those materials marketed as PICCO-25 and PICCO-100.

Another class of resins that can be employed is terpene resins, including styrenated terpenes. These terpene resins can have a molecular weight (Mw) that ranges from about 600 g/mol to about 6,000 g/mol. Typical commercially available resins of this type are marketed as PICCOLYTE S-100, as STAYBELITE Ester #10, which is a glycerol ester of hydrogenated rosin, and as WINGTACK 95, which is a polyterpene resin.

Another class of resins that can be employed is the butadiene-styrene resins having a molecular weight from about 500 g/mol to about 5,000 g/mol. A non-limiting example of this resin that is commercially available is marketed as BUTON 100, a liquid butadiene-styrene copolymer resin having a molecular weight of about 2,500 g/mol. Another class of resins is polybutadiene resins having a molecular weight (Mw) from about 500 g/mol to about 5,000 g/mol. A non-limiting example of this resin that is commercially available is marketed as BUTON 150, a liquid polybutadiene resin having a molecular weight (Mw) of from about 2,000 g/mol to about 2,500 g/mol.

Another class of resins that can be employed are the so-called hydrocarbon resins produced by catalytic polymerization of selected fractions obtained in the refining of petroleum, and having a molecular weight (Mw) of from about 500 g/mol to about 5,000 g/mol. Examples of such resin are those marketed as PICCOPALE-100, and as AMOCO and VELSICOL resins. Similarly, polybutenes obtained from the polymerization of isobutylene may be included as a tackifier.

The resin may also include rosin materials, such as low molecular weight styrene hard resins such as the material marketed as PICCOLASTIC A-75, disproportionated pentaerythritol esters, and copolymers of aromatic and aliphatic monomer systems of the type marketed as VELSICOL WX-1232.

Rosins may be any standard material of commerce known as "rosin", or a feedstock containing rosin. Rosin is mainly a mixture of C20, tricyclic fused-ring, monocarboxylic acids, typified by pimaric and abietic acids, which are commonly referred to as "resin acids." Any one or more of the C20 cyclic carboxylic acid-containing isomers present in rosin may be used. Rosin is the residue left after distilling off the volatile oil from the oleoresin obtained from *Pinus palustris* and other species of *Pinus*, Pinaceae. It is available as wood rosin (from Southern pine stumps after harvesting the stumps, chipping the stumps into small chips, extracting the chips with hexane or higher-boiling paraffin, and distilling the hexane or paraffin to yield wood rosin) gum rosin (the exudates from incisions in the living tree, *P. palustris* and *P. caribaea*) and tall oil rosin. Rosin contains about 90% resin acids and about 10% neutral matter. The acids present in natural rosin may be purified by, for example, by saponification, extraction of the neutral matter and reacidifying. Of the resin acids about 90% are isomeric with abietic acid ($C_{20}H_{30}O_2$); the other 10% is a mixture of dihydroabietic acid ($C_{20}H_{32}O_2$) and dehydroabietic acid ($C_{20}H_{28}O_2$)). (See The Merck Index, Tenth Ed. Rahway, N.J., USA, 1983, page 1191, entry 8134). Tall oil, also known as liquid rosin, is a byproduct of the wood pulp industry and is usually recovered from pinewood "black liquor" of the sulfate or Kraft paper process. According to the Kraft process, pinewood is digested with alkali and sulfide, producing tall oil soap and crude sulfate turpentine as by-products. Acidification of this soap followed by fractionation of the crude tall oil yields tall oil rosin and fatty acids. Tall oil typically contains rosin acids (about 34 wt % to 40 wt %), fatty acids such as oleic and linoleic acids (about 50 wt % to about 60 wt %) and neutral matter (about 5 wt % to about 10 wt %). (See The Merck Index, Tenth Ed., page 1299, entry 8917). For example, the rosin can contain at least about 90 wt % resin acids and less than about 10 wt % fatty acids. Some rosin dimerization product, which may form during the fractionation process, may also be present in the tall oil rosin. Rosin is available commercially in several grades (for example, under the tradename RESINALL from Resinall Corporation, and other products supplied by Hercules, Aarakawa, etc.). A standard grade of rosin is available commercially from Union Camp Corporation (Wayne, N.J.) under the UNITOL tradename. Commercially available rosins that can be used to practice the present disclosure also include SYLVARES RE 115, available from Arizona Chemical and SYLVARES RE 104, available from Arizona Chemical.

As used herein, the term "rosin" collectively includes natural rosins, liquid rosins, modified rosins and the purified rosin acids, and derivatives of rosin acids, including partially to completely neutralized salts with metal ions, e.g. resinate, etc. The rosin may be gum, wood or tall oil rosin, and can be tall oil rosin.

The rosin material may be modified rosin such as dimerized rosin, hydrogenated rosin, disproportionated rosin, or esters of rosin. Essentially any reaction conditions recognized in the art for preparing modified rosin resins (including derivatives thereof) may be employed to prepare a modified rosin. Rosins can be modified by, for example, esterification of some or all of the carboxylic moieties or by forming carboxylate salts by saponification. Esters can be prepared by esterifying the rosin with polyhydric alcohols containing from 2 to 6 alcohol groups.

Phenolic-modified rosin esters can be prepared by the reaction of rosin and a phenolic compound. This phenolic resin is then esterified with a polyhydric alcohol providing phenolic-modified rosin esters. Typically, the combinations of reactants are exposed to an elevated temperature in the range of about 100° C. to about 300° C. At these elevated temperatures, the reactants undergo covalent bond-forming reactions with other reactants, so that a resinous material is formed. Reaction products of rosins and their methods of preparation are well known in the art (See for example U.S. Pat. No. 2,007,983).

Aromatic tackifiers can include thermoplastic hydrocarbon resins derived from styrene, alpha-methylstyrene, and/or vinyltoluene, and polymers, copolymers and terpolymers thereof, terpenes, terpene phenolics, modified terpenes, and combinations thereof. KRYSTALEX 3100 is an example low molecular weight thermoplastic hydrocarbon polymer derived largely from alphamethylstryene with a Ring and Ball softening point of from about 97° C. to about 103° C., commercially available from Hercules Inc.

A more comprehensive listing of tackifiers, which can be employed, is provided in the TAPPI CA Report #55, February 1975, pages 13-20, a publication of the Technical Association of the Pulp and Paper Industry, Atlanta, Ga., which lists well over 200 tackifier resins that are commercially available.

Exemplary resins that can be employed will generally have average softening points ranging from about 85° C. to about 130° C., such as from about 100° C. to about 125° C., a weight average molecular weight greater than about 1000 g/mol, an acid number of less than about 20, and/or a Brookfield viscosity at 125° C. of greater than about 10,000 cPs, according to ASTM D-3236.

One can determine the molecular weight and softening point of a resin by dissolving the material in a suitable solvent such as tetrahydrofuran, and analyzing a sample of that solution using gel permeation chromatography. The molecular weight average in grams/mole, Mw, is determined by comparison to the retention time and elution profile of polystyrene standards of known molecular weight (commercially available from many Chromatography supply houses, e.g., Supelco, Inc. or Waters Associates). The softening point may be measured using a Mettler FP90 Central Processor and a Mettler FP83 HT Dropping Point cell with a softening point ring.

Polymers

Compositions can include one or more polymers (also referred to as a "binder"). Compositions of the present disclosure may include from about 10 wt % to about 50 wt % of polymer, such as from about 15 wt % to about 45 wt %, such as from about 20 wt % to about 40 wt %, such as from about 25 wt % to about 35 wt %, based on the total weight of the composition.

In at least one embodiment, a polymer is selected from the group consisting of ethylene vinyl acetate, polyethylene, polypropylene, thermoplastic rubber, polyamide, polyurethane, polyester, and mixture(s) thereof. For example, a mixture of polymers can be used where a first polymer (for example, ethylene vinyl acetate) and a second polymer (such as a polyethylene) are present in a composition of the present disclosure. In at least one embodiment, a weight ratio of first polymer to second polymer is from about 1:10 to about 10:1, such as from about 1:5 to about 5:1, such as from about 1:2 to about 2:1, such as about 1:1.

Ethylene/Vinyl Acetate Copolymers

The hot melt adhesive composition can include at least one ethylene/vinyl acetate copolymer (an EVA copolymer). The term "ethylene/vinyl acetate copolymers" includes copolymers derived from the copolymerization of ethylene and vinyl acetate.

The relative amount of the vinyl acetate comonomer incorporated into ethylene/vinyl acetate copolymers can be from about 1 wt % to about 45 wt % of the total copolymer or even higher. The ethylene/vinyl acetate copolymer can have varied amounts of vinyl acetate content, such as the EVA copolymer has a vinyl acetate content of from about 6 wt % to about 40 wt %, such as from about 12 wt % to about 32 wt %. The ethylene/vinyl acetate copolymer may optionally be modified by methods well known in the art (for example, grafting), including modification with an unsaturated carboxylic acid or its derivatives.

Suitable ethylene/vinyl acetate copolymers include those available from E.I. du Pont de Nemours and Company (DuPont), Wilmington, Del. under the ELVAX tradename. Other ethylene/vinyl acetate copolymers include those available from Exxon Chemical Co. under the tradename ESCORENE and also from Millennium Petrochemicals, Rolling Meadows, Ill., under the tradename ULTRATHENE and AT copolymers available from AT Polymers & Film Co., Charlotte, N.C. and EVATANE from Atofina Chemicals, Philadelphia, Pa.

In some embodiments, a mixture of two or more different ethylene/vinyl acetate copolymers can be used in the hot melt adhesive compositions in place of a single copolymer as long as the average values for the comonomer content will be within the range indicated above.

In at least one embodiment, an EVA has a density (ASTM D1505) of from about 0.92 g/cm$^3$ to about 0.96 g/cm$^3$, such as from about 0.94 g/cm$^3$ to about 0.95 g/cm$^3$. In at least one embodiment, an EVA has a melt index (190° C./2.16 kg) (ASTM D1238) of from about 100 g/10 min to about 200 g/10 min, such as from about 125 g/10 min to about 175 g/10 min, such as from about 140 g/10 min to about 160 g/10 min. In some embodiments, an EVA has a Vicat softening temperature (ASTM D1525) of from about 30° C. to about 70° C., such as from about 40° C. to about 60° C. In some embodiments, an EVA has a tensile strength at break (ASTM D638) of from about 0.1 MPa to about 6 MPa, such as from about 1 MPa to about 4 MPa, such as from about 1.5 MPa to about 3 MPa. In at least one embodiment, an EVA has an elongation at break (ASTM D638) of from about 400% to about 700%, such as from about 500% to about 600%. An EVA can have a flexural modulus 1% secant (ASTM D790) of from about 10 MPa to about 30 MPa, such as from about 15 MPa to about 25 MPa.

In at least one embodiment, an EVA is ESCORENE Ultra UL 7720, commercially available from ExxonMobil Chemical Company (Baytown, Texas). ESCORENE™ Ultra UL 7720 has a density of 0.945 g/cm$^3$ (ASTM D1505), a melt index (190° C./2.16 kg) of 150 g/10 min (ASTM D1238), a vinyl acetate content of 27.6 wt %, a peak melting temperature of 66° C., a Vicat softening temperature of 51° C. (ASTM D1525), a tensile strength at break of 2.3 MPa (ASTM D638), an elongation at break of 520% (ASTM D638), and a flexural modulus 1% secant of 19 MPa (ASTM D790).

In at least one embodiment, an EVA is ESCORENE Ultra UL 7710, commercially available from ExxonMobil Chemical Company (Baytown, Texas). ESCORENE™ Ultra UL 7710 has a density of 0.942 g/cm$^3$ (ASTM D1505), a melt index (190° C./2.16 kg) of 420 g/10 min (ASTM D1238), a vinyl acetate content of 26.7 wt %, a peak melting temperature of 65° C., a Vicat softening temperature of 47° C. (ASTM D1525), a tensile strength at break of 1.8 MPa (ASTM D638), an elongation at break of 330% (ASTM D638), and a flexural modulus 1% secant of 15 MPa (ASTM D790).

Ethylene vinyl acetate copolymers of the present disclosure may be obtained by, for example, high pressure polymerization of ethylene and vinyl acetate. In some embodiments, ethylene vinyl acetate copolymers of the present disclosure may be obtained as described in U.S. Pat. No. 6,207,748 or European Patent No. 0078122, incorporated herein by reference.

Polyethylene (C$_2$-Based Polymer)

In one or more embodiments, the adhesive composition includes a C$_2$-based polymer component, which may include one or more ethylene-based polymer(s). In at least one embodiment, the C$_2$-based polymer component includes more than about 50 wt % ethylene-derived units and from about 1 wt % to about 49.9 wt % of units derived from at least one first comonomer. The first comonomer is an alpha-olefin, such as propylene, 1-butene or 1-octene. The first comonomer may be selected from the group consisting of propylene, a C$_4$ to C$_{20}$ alpha-olefin, and combinations thereof. In some embodiments, the C$_2$-based polymer component is a random copolymer and in other embodiments the C$_2$-based polymer component is an elastomeric random copolymer.

In some embodiments, the C$_2$-based polymers include units derived from ethylene and from about 1 wt % to about 49 wt % (such as from about 5 wt % to about 40 wt %) of units derived from C$_3$ to C$_{10}$ alpha-olefins. In another embodiment, the first comonomer may include at least one C$_3$ to C$_8$ alpha-olefin. In one or more embodiments, the first comonomer units may derive from propylene, 1-butene, 1-hexene, 4-methyl-1-pentene, 1-octene, and/or 1-decene, such as, 1-hexene or 1-octene.

In one or more embodiments, the C$_2$-based polymers include at least about 1 wt %, at least about 2 wt %, at least about 3 wt %, at least about 5 wt %, at least about 6 wt %, at least about 8 wt %, or at least about 10 wt % of at least one first comonomer selected from the group consisting of C$_3$ to C$_{20}$ alpha-olefins, and combinations thereof. For example, the C$_2$-based polymer can include about 51 wt % to about 99 wt % of ethylene-derived units and about 49 wt % to about 1 wt % of octene-derived units, based on the weight of the C$_2$-based polymer. In those or other embodiments, the C$_2$-based polymers may include up to about 49 wt %, or up to about 39 wt %, or up to about 29 wt %, or up to about 19 wt %, or up to about 15 wt %, or up to about 10 wt %, or up to about 8 wt %, or up to about 5 wt %, or up to about 1 wt % of at least one first comonomer selected from the group consisting of C$_3$ to C$_{20}$ alpha-olefin, such as 1-octene, and combinations thereof, based on the weight of the polymer. Stated another way, the C$_2$-based polymers may include at least about 51 wt %, or at least about 60 wt %, or at least about 70 wt %, or at least about 75 wt %, or at least about 80 wt %, or at least about 82 wt %, or at least about 84 wt %, or at least about 86 wt %, or at least about 88 wt %, or at least about 90 wt % of ethylene-derived units; and in these or other embodiments, the $C_2$-based polymers may include up to about 99 wt %, or up to about 98 wt %, or up to about 97 wt %, or up to about 95 wt %, or up to about 94 wt %, or up to about 92 wt %, or up to about 90 wt % of ethylene-derived units, based on the weight of the polymer.

The $C_2$-based polymers of one or more embodiments are characterized by having a single melting temperature as determined by differential scanning calorimetry (DSC). The melting point is defined as the temperature of the greatest heat absorption within the range of melting of the sample. The $C_2$-based polymer may show secondary melting peaks adjacent to the principal peak, but for purposes herein, these secondary melting peaks are considered together as a single melting point, with the highest of these peaks being considered the melting point (Tm) of the $C_2$-based polymer.

In one or more embodiments, the Tm of the $C_2$-based polymers (as determined by DSC) is less than about 110° C., or less than about 100° C., or less than about 90° C., or less than about 80° C., or less than about 70° C., or less than about 60° C., or less than about 50° C., or less than about 40° C., or less than about 30° C.

In one or more embodiments, the $C_2$-based polymers may be characterized by a heat of fusion (Hf), as determined by differential scanning calorimetry according to ASTM D-3418-03. In one or more embodiments, the heat of fusion of the $C_2$-based polymer is less than about 250 J/g, or less than about 200 J/g, or less than about 150 J/g, or less than about 100 J/g. In other embodiments, the heat of fusion is from any lower limit of about 1 J/g, or about 10 J/g, or about 20 J/g, or about 30 J/g, or about 40 J/g, or about 50 J/g, or about 60 J/g, up to any upper limit of about 250 J/g, or about 225 J/g, or about 200 J/g, or about 175 J/g, or about 150 J/g, or about 125 J/g, or about 100 J/g. For example, the heat of fusion of the $C_2$-based polymer is from about 1 J/g to about 100 J/g, or from about 1 J/g to about 150 J/g, or from about 1 J/g to about 200 J/g, or from about 1 J/g to about 250 J/g. For example, the heat of fusion of the $C_2$-based polymer is from about 60 J/g to about 250 J/g. The heat of fusion may be reduced by using additional comonomer, operating at higher polymerization temperatures, and/or using a different catalyst that provides reduced levels of steric constraints and favors more propagation errors for monomer insertion.

In one or more embodiments, the $C_2$-based polymer may have a percent crystallinity of from about 0.3% to about 40%, from about 0.5% to about 30%, from about 1% to about 25%, or from about 5% to about 20%. Percent crystallinity may be determined by dividing the heat of fusion of a sample by the heat of fusion of a 100% crystalline polymer, which is 293 J/g (joules/gram) for polyethylene according to Wunderlich, B. Macromolecular Physics, Volume 1, p. 388, Academic Press, 1973.

In one or more embodiments, the $C_2$-based polymer may have a density of from about 0.85 g/cm$^3$ to about 0.92 g/cm$^3$, from about 0.87 g/cm$^3$ to about 0.90 g/cm$^3$, or from about 0.88 g/cm$^3$ to about 0.89 g/cm$^3$ at 23° C., as measured per the ASTM D-792 test method.

In one or more embodiments, the $C_2$-based polymer may have a melt flow rate (MFR), as measured according to ASTM D-1238, 2.16 kg weight at 230° C., of greater than or equal to about 0.3 dg/min, or at least about 0.5 dg/min, or at least about 0.8 dg/min, or at least about 1.0 dg/min. In these or other embodiments, the melt flow rate may be equal to or less than about 7000 dg/min, or less than about 6000 dg/min, or less than about 5000 dg/min, or less than about 4000 dg/min, or less than about 3000 dg/min, or less than about 2000 dg/min, or less than about 1000 dg/min, or less than about 900 dg/min, or less than about 700 dg/min, or less than about 500 dg/min, or less than about 350 dg/min, or less than about 250 dg/min, or less than about 100 dg/min.

In one or more embodiments, the $C_2$-based polymer may have a melt flow rate (MFR), as measured according to the ASTM D-1238, 2.16 kg weight at 230° C., greater than or equal to about 250 dg/min, greater than or equal to about 500 dg/min, or greater than or equal to about 1,000 dg/min, or greater than or equal to about 1,500 dg/min, greater than or equal to about 2,000 dg/min, or greater than or equal to about 2,500 dg/min, or greater than or equal to about 3,000 dg/min, or greater than or equal to about 4,000 dg/min, or greater than or equal to about 5,000 dg/min, or greater than or equal to about 6,000 dg/min, or greater than or equal to about 7,000 dg/min.

In one or more embodiments, the $C_2$-based polymer can have a weight average molecular weight (Mw) of about 50,000 g/mol or less, for example, from about 5,000 g/mol to about 50,000 g/mol, or from about 5,000 g/mol to about 40,000 g/mol, or from about 5,000 g/mol to about 30,000 g/mol, or from about 10,000 g/mol to about 30,000 g/mol, or from about 20,000 g/mol to about 30,000 g/mol.

In one or more embodiments, the $C_2$-based polymer can have a number average molecular weight (Mn) of from about 2,500 g/mol to about 25,000 g/mol, or from about 2,500 g/mol to about 20,000 g/mol, or from about 2,500 g/mol to about 15,000 g/mol.

In one or more embodiments, the molecular weight distribution (MWD), the ratio of the weight-average molecular weight (Mw) to a number-average molecular weight (Mn), of the $C_2$-based polymer (Mw/Mn), may be from about 1 to about 20, or from about 1 to about 10, or from about 1.8 to about 6, or from about 1.8 to about 5. For example, the ratio of a weight-average molecular weight (Mw) to a number-average molecular weight (Mn) may be from about 1 to about 10, or from about 1 to about 8, or from about 1 to about 6, or from about 1 to about 4.

In some embodiments, the $C_2$-based polymers can have a viscosity (also referred to a Brookfield viscosity or melt viscosity) of at least 250 mPa·sec at 190° C. (as measured by ASTM D-3236). Such viscosity may be from about 250 mPa·sec up to about 50,000 mPa·sec, or from about 250 mPa·sec to about 25,000 mPa·sec, or from about 500 mPa·sec to about 5,000 mPa·sec, or from about 500 mPa·sec to about 4,000 mPa·sec, or from about 500 mPa·sec to from about 3,000 mPa·sec.

In some embodiments, the $C_2$-based polymers can have a viscosity (also referred to a Brookfield viscosity or melt viscosity) of greater than about 250 mPa·sec at 190° C. (as measured by ASTM D-3236), or greater than about 500 mPa·sec, or greater than about 1,000 mPa·sec, or greater than about 2,000 mPa·sec, or greater than about 3,000 mPa·sec, or greater than about 4,000 mPa·sec, or greater than about 5,000 mPa·sec.

C2-based polymers may be synthesized using any suitable polymerization method or, in some embodiments, may be obtained commercially such as AFFINITY™ polymer available from The Dow Chemical Co.

Polypropylene (Propylene-Based Polymer)

In one or more embodiments, a composition includes a propylene-based polymer. In at least one embodiment, the propylene-based polymer component includes more than about 50 wt % propylene-derived units and from about 1 wt % to about 49.9 wt % of units derived from at least one second comonomer-derived unit. The second comonomer is an alpha-olefin, such as ethylene, and thus the second comonomer derived unit can be an alpha-olefin such as ethylene. The second comonomer can be selected from the group consisting of ethylene, a $C_4$ to $C_{20}$ alpha-olefin (such as a $C_4$ to $C_{10}$ alpha-olefin, such as a $C_4$ to $C_8$ alpha-olefin), and combinations thereof. In some embodiments, the propylene-based polymer is a random copolymer and in other embodiments the propylene-based polymer is an elastomeric random copolymer. In some embodiments, the propylene-based polymers include units derived from propylene and from about 1 wt % to about 49 wt %, such as from about 5 wt % to about 40 wt % units derived from $C_4$ to $C_{10}$ alpha-olefin. In some embodiments, the second comonomer may include at least one $C_4$ to $C_8$ alpha-olefin. In one or more embodiments, the second comonomer units may derive from ethylene, 1-butene, 1-hexene, 4-methyl-1-pentene, 1-octene, and/or 1-decene, such as, 1-hexene or 1-octene.

In one or more embodiments, the propylene-based polymers include at least about 1 wt %, at least about 2 wt %, at least about 3 wt %, at least about 5 wt %, at least about 6 wt %, at least about 8 wt %, or at least about 10 wt % of at least one second comonomer selected from the group consisting of ethylene, $C_4$ to $C_{20}$ alpha-olefins, and combinations thereof. For example, the propylene-based polymer can include from about 51 wt % to about 99 wt % of propylene-derived units and about 49 wt % to about 1 wt % of ethylene-derived units, based on the weight of the propylene-based polymer. In those or other embodiments, the propylene-based polymers may include up to about 49 wt %, or up to about 39 wt %, or up to about 29 wt %, or up to about 19 wt %, or up to about 15 wt %, or up to about 10 wt %, or up to about 8 wt %, or up to about 5 wt %, or up to about 1 wt % of at least one second comonomer selected from the group consisting of ethylene, $C_4$ to $C_{20}$ alpha-olefin, and combinations thereof, based on the weight of the polymer. Stated another way, the propylene-based polymers may include at least about 51 wt %, or at least about 60 wt %, or at least about 70 wt %, or at least about 75 wt %, or at least about 80 wt %, or at least about 82 wt %, or at least about 84 wt %, or at least about 86 wt %, or at least about 88 wt %, or at least about 90 wt % of propylene-derived units; and in these or other embodiments, the propylene-based polymers may include up to about 99 wt %, or up to about 98 wt %, or up to about 97 wt %, or up to about 95 wt %, or up to about 94 wt %, or up to about 92 wt %, or up to about 90 wt % of propylene-derived units, based on the weight of the polymer.

The propylene-based polymers of one or more embodiments are characterized by having a single melting temperature as determined by differential scanning calorimetry (DSC). The melting point is defined as the temperature of the greatest heat absorption within the range of melting of the sample. The propylene-based polymer may show secondary melting peaks adjacent to the principal peak, but for purposes herein, these secondary melting peaks are considered together as a single melting point, with the highest of these peaks being considered the melting point (Tm) of the propylene-based polymer.

In one or more embodiments, the Tm of the propylene-based polymers (as determined by DSC) is less than about 130° C., or less than about 120° C., or less than about 115° C., or less than about 110° C., or less than about 100° C.

In one or more embodiments, the propylene-based polymers may be characterized by a heat of fusion (Hf), as determined by differential scanning calorimetry according to ASTM D-3418-03. In one or more embodiments, the heat of fusion of the propylene-based polymer is from about 45 to about 150 J/g, or from about 55 to about 140 J/g, or from about 65 to about 130 J/g, or from about 75 to about 120 J/g, or from about 80 J/g to about 110. For example, the heat of fusion of the propylene-based polymer is from about 45 to about 75 J/g. The heat of fusion may be reduced by using additional comonomer, operating at higher polymerization temperatures, and/or using a different catalyst that provides reduced levels of steric constraints and favors more propagation errors for propylene insertion.

The propylene-based polymer can have a triad tacticity of three propylene units, as measured by $^{13}C$ NMR, of about 75% or greater, about 80% or greater, about 82% or greater, about 85% or greater, or about 90% or greater. In one or more embodiments, the propylene-based polymer has a triad tacticity of from about 50% to about 99%, such as from about 60% to about 99%, such as from about 75% to about 99%, such as from about 80% to about 99%, such as from about 60% to about 97%. Triad tacticity is determined by the methods described in U.S. Patent Application Publication No. 2004/0236042. If the triad tacticity of the copolymer is too high, the level of stereo-irregular disruption of the chain is too low and the material may not be sufficiently flexible. If the triad tacticity is too low, the bonding strength may be too low.

In one or more embodiments, the propylene-based polymer may have a percent crystallinity of from about 22% to about 60%, from about 22% to about 50%, or from about 25% to about 40%. Percent crystallinity may be determined by dividing the heat of fusion of a sample by the heat of fusion of a 100% crystalline polymer, which is 207 joules/gram for isotactic polypropylene according to Bu, H.-S.; Cheng, S. Z. D.; Wunderlich, B., Makromol. Chem. Rapid Commun., 1988, 9, p. 75.

In one or more embodiments, the propylene-based polymer may have a density of from about 0.85 g/cm$^3$ to about 0.92 g/cm$^3$, or from about 0.87 g/cm$^3$ to about 0.90 g/cm$^3$, or from about 0.88 g/cm$^3$ to about 0.89 g/cm$^3$ at 23° C., as measured per the ASTM D-792 test method.

In one or more embodiments, the propylene-based polymer may have a melt flow rate (MFR), as measured according to the ASTM D-1238, 2.16 kg weight at 230° C., greater than or equal to about 250 dg/min, or greater than or equal to about 500 dg/min, or greater than or equal to about 1,000 dg/min, or greater than or equal to about 1,500 dg/min, or greater than or equal to about 2,000 dg/min, or greater than or equal to about 2,500 dg/min, or greater than or equal to about 3,000 dg/min, or greater than or equal to about 4,000 dg/min, or greater than or equal to about 5,000 dg/min, or greater than or equal to about 6,000 dg/min, or greater than or equal to about 7,000 dg/min.

In one or more embodiments, the propylene-based polymer can have a weight average molecular weight (Mw) of about 50,000 g/mol or less, for example, from about 5,000 to about 50,000 g/mol, or from about 5,000 g/mol to about 40,000 g/mol, or from about 5,000 g/mol to about 30,000 g/mol, or from about 10,000 g/mol to about 30,000 g/mol, or from about 20,000 g/mol to about 30,000 g/mol.

In one or more embodiments, the propylene-based polymer can have a number average molecular weight (Mn) of from about 2,500 g/mol to about 25,000 g/mol, or from about 2,500 g/mol to about 20,000 g/mol, or from about 2,500 g/mol to about 15,000 g/mol.

In one or more embodiments, the molecular weight distribution (MWD), the ratio of the weight-average molecular weight (Mw) to a number-average molecular weight (Mn), of the propylene-based polymer (Mw/Mn), may be from about 1 to about 20, or from about 1 to about 10, or from about 2 to about 5, or from about 1 to about 3. For example, the ratio of a weight-average molecular weight (MW) to a number-average molecular weight (Mn) can be from 1 to 10, or 1 to 8, or 1 to 6, or 1 to 4.

In another embodiment, the propylene-based polymers described above may also have a viscosity (also referred to a Brookfield viscosity or melt viscosity) of from about 100 to about 1500 mPa·sec at 190° C. (as measured by ASTM D-3236), such as from about 125 mPa·sec to about 1400 mPa·sec, or about 150 mPa·sec to about 1300 mPa·sec, or about 175 mPa·sec to about 1200 mPa·sec, or about 200 mPa·sec to about 1100 mPa·sec, or about 225 mPa·sec to about 1000 mPa·sec, or about 250 mPa·sec to about 900 mPa·sec, or about 300 mPa·sec to about 800 mPa·sec, or about 400 mPa·sec to about 600 mPa·sec, as measured by ASTM D-3236 at 190° C.

Propylene-based polymers of the present disclosure may be obtained as described in U.S. Pat. Nos. 10,294,357; 7,524,910; 8,193,289, each incorporated herein by reference.

Polyamides

Compositions of the present disclosure may include one or more polyamides. Polyamides include polymeric fatty acid amides and polyamide containing copolymers. Examples of the polymeric fatty acid polyamides can be commercially available products having a softening point of about 80° C. to 200° C. These are prepared in the conventional manner using conventional amidification techniques. In general, this amidification can be conducted at temperatures of from about 180° C. to about 280° C. by condensing polymeric fatty acids, or mixtures thereof, with other dicarboxylic acids, with ethylene diamine or mixture of ethylene diamine with other amine reactants, primarily other diamines. Polyamides can be copolymer resins having a melting point of from about 80° C. to about 160° C. and prepared from three monomers as disclosed in U.S. Pat. No. 4,148,775. Examples of such resins are those prepared from nylon 6,6 salt, nylon 6,9 salt, nylon 6,10 salt, nylon 6,12 salt, etc. Exemplary polyamide copolymer resins are those prepared from three or four monomers. Examples of such resins are nylon 6/6, 6/12, nylon 6/6, 10/12, nylon 6/6, 12/12, nylon 6/6, 9/12, nylon 6/6, 6/6,10,12, 6/6,6/11/12, etc.

Polyamides which are useful as hot melt adhesives can be polyamides described in U.S. Pat. Nos. 3,449,273 and 4,148,775.

Polyesters

Compositions of the present disclosure may include one or more polyesters. The term "polyester", as used herein, is intended to include "copolyesters" and is understood to mean a synthetic polymer prepared by the polyesterification and polycondensation of one or more difunctional carboxylic acids with one or more difunctional hydroxyl compounds. Typically the difunctional carboxylic acid is a dicarboxylic acid and the difunctional hydroxyl compound is a dihydric alcohol such as, for example, glycols and diols. Alternatively, the difunctional carboxylic acid may be a hydroxy carboxylic acid such as, for example, p-hydroxy-benzoic acid, and the difunctional hydroxyl compound may be an aromatic nucleus bearing 2 hydroxyl substituents such as, for example, hydroquinone. For polyesters, the term "repeating unit", as used herein, means an organic structure having a dicarboxylic acid derived-unit and a diol derived-unit bonded through a carbonyloxy group. Thus, the dicarboxylic acid derived-units may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a polyester.

The polyesters that can be used in the hot-melt adhesive compositions of the present disclosure can be dicarboxylic acid derived-units and diol derived-units. The polyesters can contain substantially equal molar proportions of diacid derived-units (100 mol %) and diol derived-units (100 mol %) which reacted in substantially equal proportions such that the total moles of repeating units is equal to 100 mol %. The mole percentages provided in the present disclosure, therefore, may be based on the total moles of diacid derived-units, the total moles of diol derived-units, or the total moles of repeating units. For example, a polyester containing 30 mol % adipic acid, based on the total diacid derived-units, means the polyester contains 30 mol % adipic acid derived-units out of a total of 100 mol % diacid derived-units. Thus, there are 30 moles of adipic acid derived-units among every 100 moles of diacid derived-units. In another example, a polyester containing 30 mol % 1,4-butanediol, based on the total diol derived-units, means the polyester contains 30 mole percent 1,4-butanediol derived-units out of a total of 100 mol % diol derived-units. Thus, there are 30 moles of 1,4-butanediol derived-units among every 100 moles of diol derived-units.

The polyester can include diacid derived-units of from about 30 mol % to about 60 mol %, based on the total moles of diacid derived-units, of the derived-units of adipic acid, glutaric acid, or a combination thereof, about 30 mol % to about 60 mol % of the derived-units of terephthalic acid, and about 0 mol % to about 40 mol % of at least one modifying dicarboxylic acid having from about 4 to about 40 carbon atoms. For example, the polyester can have from about 30 mol % to about 60 mol % of the derived-units of adipic acid or glutaric acid, from about 30 mol % to about 50 mol % of the derived-units of terephthalic acid, and from about 0 mol % to about 30 mol % of the derived-units of a modifying dicarboxylic acid. In another example, the polyester can have about mol % 35 to about 60 mol % of the derived-units of adipic or glutaric acid, about 35 mol % to about 45 mol % of the derived-units of terephthalic acid and about 0 mol % to about 30 mol % of a modifying dicarboxylic acid.

The polyester can include 0 to about 30 mol % of the derived-units of at least one modifying dicarboxylic acid having about 4 to about 40 carbon atoms. Some representative examples of modifying dicarboxylic acids include, but are not limited to, succinic acid, suberic acid, pimelic acid, fumaric acid, maleic acid, itaconic acid, glycolic acid, sebacic acid, azelaic acid, dimer acid, isophthalic acid, 1,3-cyclohexanedicarboxylic acid, 1,4-cyclohexanedicarboxylic acid, and combinations thereof. For example, the modifying dicarboxylic acid can include isophthalic acid. The polyester also may include the derived-units of dicarboxylic acids containing specialized functionalities such as, for example, 5-sodiosulfoisophthalic, t-butyl isophthalic, 5-hydroxy isophthalic, and 4,4'-sulfonyl dibenzoic. Where cis and trans isomers are possible, the pure cis or trans or a mixture of cis and trans isomers may be used.

The diol component of the polyester can include about 80 mol % to about 100 mol %, based on the total moles of diol derived-units, of the derived-units of 1,4-butanediol, 1,6-hexanediol, or a combination thereof; and about 0 mol % to about 20 mol % of the derived-units of at least one modifying diol. For example, in one embodiment of the present disclosure, the polyester can include diol derived-units including about 90 mol % to 100 mol % of the derived-units of 1,4-butanediol, and about 10 mol % to about 0 mol % of the derived-units of a modifying diol. In another example, the polyester can include about 100 percent of the derived-units of 1,6-hexanediol. Examples of modifying diols include 1,4-cyclohexanedimethanol, ethylene glycol, 1,2-propanediol, 1,3-propanediol, 1,5-pentanediol, neopentyl glycol, diethylene glycol, triethylene glycol, 1,8-octanediol, 2,2,4-trimethyl-1,3-pentanediol, polyethylene glycol, poly-propylene glycol, 2,4-dimethyl-2-ethylhexane-1,3-diol; 2,2-dimethyl-1,3-propanediol, 2-ethyl-2-butyl-1,3-propanediol, 2-ethyl-2-isobutyl-1,3-propanediol, 1,3-butanediol, 1,5-pen-tanediol, 2,2,4,4-tetramethyl-1,3-cyclobutanediol, or combinations thereof.

Polyglycols such as, for example, diethylene glycol, tet-raethylene glycol, and polyalkylene glycols, may be used in combination with 1,4-butanediol. The molecular weight of the polyalkylene glycols, typically, will be from about 200 to about 10,000 g/mole. For example, the polyester also may include the derived-units of higher order alkyl analogs such as, for example, dipropylene glycol, dibutylene glycol, and dihexylene glycol. Similarly, higher order polyalkylene diols are useful, particularly polypropylene glycol and poly-tetramethylene glycol with molecular weights ranging from 200 to 10,000 g/mole.

In at least one example, the polyester of the hot-melt adhesive composition can include diacid derived-units including about 30 to about 60 mole percent of the derived-units of adipic acid, about 30 to about 50 mole percent of the derived-units of terephthalic acid, and 0 to about 30 mole percent of the derived-units of a modifying dicarboxylic acid; and diol derived-units including about 90 to 100 mole percent of the derived-units of 1,4-butanediol, and 0 to about 10 mole percent of the derived-units of the modifying diol. In the above embodiment, the modifying dicarboxylic acid can include isophthalic acid, and the modifying diol can include diethylene glycol, 1,4-cyclohexanedimethanol, or a combination thereof.

In another example, the diacid derived-units include about 40 to about 60 mole percent of the derived-units of adipic acid, about 30 to about 45 mole percent of the derived-units of terephthalic acid, and about 5 to about 30 mole percent of the derived-units of a modifying dicarboxylic acid; and the diol derived-units include about 90 to 100 mole percent of the derived-units of 1,4-butanediol and about 10 to 0 mole percent of the derived-units of 1,4-cyclohexanedimethanol. The modifying dicarboxylic acid can be isophthalic acid in the above example.

The polyester can have an inherent viscosity of from about 0.1 dL/g to about 0.35 dL/g as measured at 25° C. using 0.5 grams of polymer per 100 ml of a solvent including 60 wt % phenol and 40 wt % tetrachloroethane. Some additional examples of inherent viscosities for the polyester are about 0.1 dL/g to about 0.33 dL/g; about 0.1 dL/g to about 0.30 dL/g; about 0.1 dL/g to about 0.27 dL/g; about 0.1 dL/g to about 0.25 dL/g; and about 0.1 dL/g to about 0.20 dL/g. In order to achieve this relatively low viscosity, the molecular weight of the polyester, typically, will be in the range of about 1000 g/mole to about 15,000 g/mole. Some additional examples of molecular weight ranges of the polyester are from about 1000 g/mole to about 13,000 g/mole, about 1000 g/mole to about 10,000 g/mole; and about 1000 g/mole to about 8000 g/mole.

The polyester can also incorporate from 0 to about 5 mole percent of one or more monofunctional chain terminators to help control the rate of polymerization. Some non-limiting examples of chain terminators are one or more monofunc-tional linear aliphatic, cycloaliphatic, or aromatic carboxylic acids or monofunctional alcohols having 1 to about 36 carbon atoms. These chain terminators can contain any functional group. The functional groups can be, for example, an ionic end group such as, for example, sodiosulfobenzoic acid, a reactive end group, or a combination thereof. These various functional groups may be used to tailor the end groups of the polyester to be more acidic or basic in nature. These modifications can be useful, for example, to improve surface interaction between adhesive and substrate, or to improve compatibility between the adhesive and certain formulating ingredients.

The polyester can have a melting temperature of about 70° C. to about 130° C. For polyesters, most polymers will exhibit one or more smaller melting peaks by differential scanning calorimetry ("DSC") at temperatures below the primary melting temperature that have characteristics (e.g., melting enthalpy and peak temperature) that can be depen-dent on the thermal history of the polymer. The term "melting temperature" (abbreviated herein as "Tm"), as used herein, is defined as the peak temperature of the melting endotherm of the 2nd heat cycle. For example, if multiple melting peaks are present, then the highest peak melting temperature is considered the melting temperature of the polyester in accordance with the present disclosure. Other examples of melting temperature of a polyester are from about 80° C. to about 130° C., from about 80° C. to about 120° C., from about 90° C. to about 120° C., and from about 100° C. to about 120° C.

The polyester has a heat of melting (abbreviated herein as "ΔHm") of from about 0.1 cal/g to about 6 cal/g as measured by differential scanning calorimetry. The heat of melting is proportional to how much crystallinity is present in the polyester. Typically, ΔHm is normalized by the weight of the sample being tested and reported as either J/g or cal/g. Other examples of heat of melting ranges are from about 0.1 to about 4 cal/g, from about 0.3 to about 4 cal/g, or from about 0.5 and 3 cal/g.

The polyesters can be readily prepared from the appro-priate dicarboxylic acids, esters, anhydrides, or salts, and the appropriate diol or diol mixtures using typical polyconden-sation reaction conditions by procedures known to persons skilled in the art. They may be made by continuous, semi-continuous, and/or batch modes of operation and may utilize a variety of reactor types. Examples of suitable reactor types include, but are not limited to, stirred tank, continuous stirred tank, slurry, tubular, wiped-film, falling film, or extrusion reactors. The reaction of the diol and dicarboxylic acid may be carried out using conventional polyester polym-erization conditions or by melt phase processes.

Polyesters can be selected from polyethylene terephtha-late, polybutylene terephthalate, poly-carbonate, polyethyl-ene naphthalate and mixtures thereof and also co- and terpolymers thereof.

Polyesters of the present disclosure may be obtained as described in U.S. Pat. No. 8,431,232, incorporated herein by reference.

Polyurethanes

Compositions may include at least one polyurethane (e.g., formed from a prepolymer) having polyol derived-units and isocyanate derived-units. Such polyurethane prepolymers are well known to the industry and are generally formed through the reaction of at least one polyol and an isocyanate resulting in an isocyanate capped polyurethane prepolymer composition. The reaction may be performed using any suitable catalyst.

The polyols can be those having a weight average molecular weight of from about 200 g/mol to about 10,000 g/mol. The polyols can contain hydroxyl groups and/or active hydrogen. There are numerous patents and publications teaching the production of polyurethanes such as: U.S. Pat. No. 4,808,255 to Markevka et al. issued Feb. 28, 1989 teaching the use of polyesterpolyols; U.S. Pat. No. 4,820,368 to Markevka et al. Issued Apr. 11, 1989 teaching the use of polyether polyols; U.S. Pat. No. 4,775,719 to Markevka et al. issued Oct. 4, 1988 teaching the use of polyhydroxy polyols; and U.S. Pat. No. 5,441,808 to Anderson et al. issued Aug. 15, 1995 teaching the use of a polyester polyether copolymers. One of skill in the art would be familiar with the different methods used to manufacture polyurethane prepolymers.

Non-limiting examples of polyols useful herein are VORANOL® 220-110 N and VORANOL® 220-056, polyether polyols available from Dow Chemical Co. located in Midland, Mich.; RUCOFLEX™ S-107-55 and DYNA-COLL® 7210, 7250, 7110, and 7111, amorphous polyester polyols available from RUCO Polymer Corp. located in Hicksville, N.Y. and Huls America in Piscataway, N.J. respectively; RUCOFLEX® S-105-36 and DYNACOLL® 7340 crystalline polyester polyol available from RUCO Polymer and from Huls America respectively.

Isocyanate compounds can be monomeric small molecules having 2 or more —NCO groups. Isocyanate compounds useful for forming the prepolymer include organic, aliphatic, and aromatic isocyanate compounds having an isocyanate functionality of about 2 or more. The isocyanate compounds can have from 1 to 10 aliphatic or aromatic groups substituted by the isocyanate group. The isocyanate compounds can also contain other substituents which do not substantially adversely affect the viscosity of the isocyanate terminated prepolymers, the adhesive properties of the bond line, or the reactivity of the —NCO groups during the formation of the prepolymer. The isocyanate compound can also include mixtures of both aromatic and aliphatic isocyanates and isocyanate compounds having both aliphatic and aromatic character.

Typical aromatic isocyanate compounds include diphenylmethane diisocyanate compounds (MDI) including its isomer, carbodiimide modified MDI, diphenylmethane-4,4'-diisocyanate, diphenyl-methane-2,4'-diisocyanate, oligomeric phenyl methylene isocyanates; toluene diisocyanate compounds (TDI) including isomers thereof, tetramethylxylene diisocyanate (TMXDI), isomers of naphthylene diisocyanate, isomers of triphenylmethane triisocyanate, and mixtures thereof. Aliphatic di, tri, and polyisocyanates are also useful including, for example, isophorone diisocyanate, hydrogenated aromatic diisocyanates, aliphatic polyisocyanate, cycloaliphatic polyisocyanates, and others.

The NCO-terminated polyurethane prepolymer can be prepared by reacting a stoichiometric excess of diisocyanate with the polyol components. The reactants are in such proportions that the resulting percent isocyanate is from about 1% by weight to about 5% by weight, such as from about 2% by weight to about 4% by weight based on 100 parts total prepolymer solids. The prepolymer can be processed at temperatures of from about 70° C. to about 110° C., such as from about 80° C. to about 95° C.

Optionally, catalysts may be utilized to improve curing speed without adversely affecting other physical properties. European Pat. Applications 0,492,824, A2 published Jan. 7, 1992, 0,455,400, A2 published Jun. 11, 1991 and 0,668,302, A1 published Aug. 23, 1995 disclose the use of 4,4'-(oxydi-2,1-ethanediyl)bis-morpholine for use in catalyzing polyurethane reactions.

Additional Components

The adhesive compositions can optionally include small amounts of additional materials. Such optional additives can include plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fireretardants, lubricants, reinforcing agents such as glass fiber and flakes, processing aids, slip additives, antiblock agents such as silica or talc, release agents and/or mixtures thereof. These additives are described in the Kirk Othmer Encyclopedia of Chemical Technology.

These additives, when present, may be present in the composition in amounts of at least about 0.01 wt %, at least about 0.1 wt %, at least about 2 wt %, or at least about 5 wt % of the total weight of the composition up to about 15 wt % of the total weight of the composition. The additives may be present in amounts from about 0.01 wt % to about 15 wt %, such as from about 0.01 wt % to about 10 wt %, such as from about 0.01 wt % to about 5 wt %.

Liquid plasticizers such as oils, and solid plasticizers such as benzoate esters available from Velsicol Chemical Corp. in Rosemont, Ill. under the trade name BENZOFLEX, can be used to obtain longer open times, lower viscosity, improved adhesion, and improved cold temperature flexibility. Plasticizing oils that may be useful include olefin oligomers and low molecular weight polymers, as well as vegetable and animal oils and their derivatives. Suitable petroleum-derived oils can include relatively high boiling point materials containing a minor proportion of aromatic hydrocarbons, such as less than about 30 wt %, such as less than about 15 wt % by weight of the oil. Alternatively, the oil may be essentially free, or free, of aromatics.

Stabilizers or antioxidants can be added to protect the composition from degradation caused by reaction with oxygen induced by such things as heat, light, or residual catalyst from the raw materials such as the tackifying resin.

Stabilizers or antioxidants can be high molecular weight hindered phenols and multifunctional phenols such as sulfur- and phosphorous-containing phenol. Hindered phenols are characterized as phenolic compounds that contain sterically bulky radicals in close proximity to the phenolic hydroxyl group. Non-limiting examples of hindered phenols include 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate (IRGANOX 1010); n-octadecyl-3(3,5-di-tert-butyl-4-hydroxyphenyl)-propionate (IRGANOX-1076); 4,4'-methylenebis (2,6-tert-butyl-phenol); 4,4'-thiobis (8-tert-butyl-o-cresol); 2,6-di-n-tert-butylphenol; 6-(4-hydroxyphenoxy)-2,4-bis(n-octyl-thio)-1,3,5 triazine; (di-n-octylthio)ethyl 3,5-di-tert-butyl-4-hydroxy-benzoate; sorbitol hexa[3-(3,5di-tert-butyl-4-hydroxy-phenyl)-propionate]; and 1,3,5-tri(3,5-di-tert-butyl-4-hydroxybenzyl-isocyanurate (IRGANOX 3114).

The performance of these antioxidants may be enhanced by using known synergists such as, for example, thiodipropionate esters and phosphites. For example, distearylthiodipropionate may be used.

The composition optionally includes a crosslinking agent selected from the group consisting of melamine resins, epoxy resins, amine-containing resins, metal alkoxides, and metal salts of organic acids. Crosslinking, also known as curing, can provide stronger and more elastic adhesive compositions by forming reversible or irreversible links between the individual polymer chains. Heat and/or pressure can cure the adhesive composition after it has been applied. Although a crosslinking agent may be desirable in some cases, crosslinking is not necessary in others. Accordingly, of note is the composition that does not include a crosslinking agent.

Crosslinking agents or curing agents that can be used with polymers containing acid cure sites include di- and multifunctional amine-containing resins, such as hexamethylenediamine carbamate (HMDAC), hexamethylenediamine (HMDA), triethylenetetramine, tetramethylene-pentamine, hexamethylenediamine-cinnamaldehyde adduct, and hexamethylene-diamine dibenzoate salt. Aromatic amines can also be used as curing agents. Combinations of two or more curing agents may also be used. The curing agent(s) may be added neat or in an inert carrier. Methods for curing using aqueous HMDA are described in U.S. Pat. No. 7,001,957.

Properties of Adhesive Compositions

In some embodiments, the composition has an elongation at break, measured according to method ISO 37, of greater than about 150%, such as from about 200% to about 250%, such as from about 300% to about 350%, such as from about 400% to about 450%.

In at least one embodiment, the composition has a Brookfield viscosity @177° C. of from about 500 centipoise (cPs) to about 2,000 cPs, according to ASTM D-3236, such as from about 550 cPs to about 1,500 cPs, such as from about 600 cPs to about 1,200 cPs, such as from about 650 cPs to about 900 cPs or from about 900 cPs to about 1,200 cPs.

In at least one embodiment, the composition has a fiber tear @25° C. of from about 50% to about 100%, according to the procedure described below, such as from about 75% to about 100%, such as from about 90% to about 100%.

In some embodiments, the composition has a fiber tear @4° C. of from about 30% to about 100%, according to the procedure described below, such as from about 50% to about 95%, such as from about 75% to about 90%.

In some embodiments, the composition has a fiber tear @−18° C. of from about 30% to about 100%, according to the procedure described below, such as from about 50% to about 95%, such as from about 70% to about 95%.

In some embodiments, the composition has a set time of about 2.5 seconds or less, such as about 2.2 seconds or less, such as about 2 seconds or less, such as about 1.7 seconds or less, such as about 1.5 seconds or less, such as about 1.25 seconds or less, as determined according to the procedure described below.

Applications of Polyolefin Adhesive Compositions

Packaging

A composition of the present disclosure can be used in various packaging articles. The packaging article may be useful as a carton, container, crate, case, corrugated case, or tray, for example. More particularly, the packaging article may be useful as packaging for a cereal product, packaging for a cracker product, beer packaging, packaging for a frozen food product, paper bag, drinking cup, milk carton, juice carton, drinking cup, or as a container for shipping produce. The packaging article can be formed by applying an adhesive composition to at least a portion of one or more packaging elements. The packaging elements may be formed from paper, paperboard, containerboard, tagboard, corrugated board, chipboard, cardboard, fiberboard, plastic resin, metal, metal alloys, foil, film, plastic film, laminates, sheeting, or any combination thereof. In at least one aspect, the adhesive composition may be used to bind or bond two or more packaging elements together wherein the packaging elements are formed from the same or different type of materials. Accordingly, the packaging elements may be individually formed from paper, paperboard, containerboard, tagboard, corrugated board, chipboard, kraft, cardboard, fiberboard, plastic resin, metal, metal alloys, foil, film, plastic film, laminates, sheeting, or any combination thereof. The one or more packaging elements may also be individually coated using paper, foil, metal, metal alloys, polyethylene, polypropylene, polyester, polyethylene terephthalate, polyvinyl chloride, polyvinylidine chloride, polyvinyl acetate, polyamides, homopolymers thereof, and combinations and copolymers thereof.

Woodworking/Assembly

A composition of the present disclosure can be used in various woodworking applications including furniture, toys, musical instruments, window frames and sills, doors, flooring, fencing, tools, ladders, sporting goods, dog houses, gazebos/decks, picnic tables, etc. A composition of the present disclosure can provide a desired combination of physical properties such as stable adhesion over time, indicative of broad application temperature ranges, and can be used in a variety of woodworking applications. It should be appreciated that th composition of the present disclosure that may be well suited for use in woodworking products may also find utility in other applications as well.

In at least one embodiment, a woodworking process to prepare the woodworking application involves forming a woodworking article by applying a composition to at least a portion of a structural element. The structural element can include a variety of materials, which may be wood, plywood, plastic, and/or veneer. For example, the structural element can also include lumber, wood, fiberboard, plasterboard, gypsum, wallboard, plywood, PVC, melamine, polyester, impregnated paper, and/or sheetrock. A woodworking process can be used to form indoor furniture, outdoor furniture, trim, molding, doors, sashes, windows, millwork and cabinetry, for example.

Additional Aspects

The present disclosure provides, among others, the following aspects, each of which may be considered as optionally including any alternate aspects.

Clause 1. A composition including: a polymer; a resin; and an olefin wax.

Clause 2. The composition of Clause 1, wherein the composition includes: from about 10 wt % to about 50 wt % of the polymer, based on the total weight of the composition; from about 20 wt % to about 70 wt % of the resin, based on the total weight of the composition; and from about 1 wt % to about 50 wt % of wax, based on the total weight of the composition.

Clause 3. The composition of Clauses 1 or 2, wherein the composition includes: from about 25 wt % to about 30 wt % of the polymer, based on the total weight of the composition; from about 35 wt % to about 50 wt % of the resin, based on the total weight of the composition; and from about 15 wt % to about 30 wt % of wax, based on the total weight of the composition.

Clause 4. The composition of any of Clauses 1 to 3, wherein the olefin wax is a linear alpha olefin.

Clause 5. The composition of any of Clauses 1 to 4, wherein the olefin wax has from about 20 carbon atoms to about 50 carbon atoms.

Clause 6. The composition of any of Clauses 1 to 5, wherein the olefin wax has an olefin content of about 10% or less, based on olefinic carbon atoms divided by total carbon atoms of the olefin wax as determined by 13C NMR.

Clause 7. The composition of any of Clauses 1 to 6, wherein the olefin wax has an olefin content of from about 2% to about 4%, based on olefinic carbon atoms divided by total carbon atoms of the olefin wax as determined by 13C NMR.

Clause 8. The composition of any of Clauses 1 to 7, wherein the olefin wax includes less than about 20 wt % (vinylidene+internal olefins), based on olefinic carbon atoms divided by total carbon atoms of the olefin wax as determined by 13C NMR.

Clause 9. The composition of any of Clauses 1 to 8, wherein the olefin wax is selected from the group consisting of (1) an olefin having from about 20 carbon atoms to about 24 carbon atoms, (2) an olefin having from about 26 carbon atoms to about 28 carbon atoms, (3) an olefin having from about 26 to about 28 carbon atoms, (4) an olefin having from having at least 30 carbon atoms, and (5) combination(s) thereof.

Clause 10. The composition of any of Clauses 1 to 9, wherein the olefin wax has one or more of the following properties: a congealing point of from about 45° C. to about 65° C., according to ASTM D938; a penetration @25° C. (0.1 mm, needle), according to ASTM D1321, of from about 15 to about 40; a density @80° C. of from about 700 kg/m3 to about 900 kg/m3, according to ASTM D4052; a kinematic viscosity @100° C. of from about 3 mm2/s to about 6 mm2/s, according to ASTM D445; or a drop melting point of from about 15° C. to about 50° C. according to ASTM D3954.

Clause 11. The composition of any of Clauses 1 to 10, wherein the olefin wax has each of the following properties: a congealing point of from about 55° C. to about 60° C., according to ASTM D938; a penetration @25° C. (0.1 mm, needle), according to ASTM D1321, of from about 15 to about 40, such as from about 20 to about 30, such as from about 22 to about 26; a density @80° C. of from about 750 kg/m3 to about 800 kg/m3, according to ASTM D4052; a kinematic viscosity @100° C. of from about 4 mm2/s to about 4.5 mm2/s, according to ASTM D445; and a drop melting point of from about 30° C. to about 35° C. according to ASTM D3954.

Clause 12. The composition of any of Clauses 1 to 11, further including an additional wax.

Clause 13. The composition of any of Clauses 1 to 12, wherein total wax (olefin wax+additional wax) includes greater than 30 mol % olefin wax having at least 20 carbon atoms, based on the total amount of wax in the composition.

Clause 14. The composition of any of Clauses 1 to 13, wherein total wax (olefin wax+additional wax) includes greater than 90 mol % olefin wax having at least 20 carbon atoms, based on the total amount of wax in the composition.

Clause 15. The composition of any of Clauses 1 to 14, wherein the additional wax has one or more of the following properties: a drop melting point (ASTM D3954) of from about 90° C. to about 130° C.; penetration @25° C. (needle, 0.1 mm)(ASTM D 1321) of from about 0.1 to about 10; penetration @65° C. (needle, 0.1 mm)(ASTM D 1321) of from about 10 to about 40; or a molecular weight (Mw by gel permeation chromatography) of from about 700 g/mole to about 1,000 g/mole.

Clause 16. The composition of any of Clauses 1 to 15, wherein the additional wax has each of the following properties: a drop melting point (ASTM D3954) of from 110° C. to about 115° C., penetration @25° C. (needle, 0.1 mm)(ASTM D 1321) of from about 0.5 to about 1.5; penetration @65° C. (needle, 0.1 mm)(ASTM D 1321) of from about 15 to about 25; and a molecular weight (Mw by gel permeation chromatography) of from about 800 g/mole to about 900 g/mole.

Clause 17. The composition of any of Clauses 1 to 15, wherein the additional wax has one or more of the following properties: a drop melting point (ASTM D3954) of from about 55° C. to about 75° C.; penetration @25° C. (needle, 0.1 mm)(ASTM D 1321) of from about 8 to about 20; penetration @40° C. (needle, 0.1 mm)(ASTM D 1321) of from about 20 to about 50; kinematic viscosity @100° C. (ASTM D 445) of from about 1 cSt to about 10 cSt; or density @15° C. (ASTM D 1298) of from about 700 kg/m3 to about 1,000 kg/m3.

Clause 18. The composition of any of Clauses 1 to 17, wherein the additional wax has each of the following properties: a drop melting point (ASTM D3954) of from about 55° C. to about 75° C.; penetration @25° C. (needle, 0.1 mm)(ASTM D 1321) of from about 10 to about 15; penetration @40° C. (needle, 0.1 mm)(ASTM D 1321) of from about 30 to about 40; kinematic viscosity @100° C. (ASTM D 445) of from about 3 cSt to about 7 cSt; and density @15° C. (ASTM D 1298) of from about 800 kg/m3 to about 900 kg/m3.

Clause 19. The composition of any of Clauses 1 to 18, wherein the resin has a softening point (Ring and Ball, as measured by ASTM E-28) of from about 100° C. to about 130° C.

Clause 20. The composition of any of Clauses 1 to 19, wherein the resin has a softening point (Ring and Ball, as measured by ASTM E-28) of from about 10° C. and about 70° C.

Clause 21. The composition of any of Clauses 1 to 20, wherein the resin is a coumarone-indene resin.

Clause 22. The composition of any of Clauses 1 to 21, wherein the resin is a terpene resin.

Clause 23. The composition of any of Clauses 1 to 22, wherein the resin is a butadiene-styrene resin.

Clause 24. The composition of any of Clauses 1 to 23, wherein the resin is a rosin.

Clause 25. The composition of any of Clauses 1 to 24, wherein the resin is a thermoplastic hydrocarbon resin.

Clause 26. The composition of any of Clauses 1 to 25, wherein the polymer is selected from the group consisting of ethylene vinyl acetate, polyethylene, polypropylene, thermoplastic rubber, polyamide, polyurethane, polyester, and mixture(s) thereof.

Clause 27. The composition of any of Clauses 1 to 26, wherein the polymer is selected from the group consisting of ethylene vinyl acetate, polyurethane, and mixture(s) thereof.

Clause 28. The composition of any of Clauses 1 to 27, wherein the polymer is an ethylene vinyl acetate having a vinyl acetate content from about 12 wt % to about 32 wt %.

Clause 29. The composition of any of Clauses 1 to 28, wherein the ethylene vinyl acetate has one or more of the following properties: a density (ASTM D1505) of from about 0.92 g/cm3 to about 0.96 g/cm3; a melt index (190° C./2.16 kg) (ASTM D1238) of from about 100 g/10 min to about 200 g/10 min; a Vicat softening temperature (ASTM D1525) of from about 30 oC to about 70° C.; a tensile strength at break (ASTM D638) of from about 0.1 MPa to about 6 MPa; an elongation at break (ASTM D638) of from about 400% to about 700%; or a flexural modulus 1% secant (ASTM D790) of from about 10 MPa to about 30 MPa.

Clause 30. The composition of any of Clauses 1 to 29, wherein the ethylene vinyl acetate has each of the following properties: a density (ASTM D1505) of from about 0.94 g/cm3 to about 0.95 g/cm3; a melt index (190° C./2.16 kg)

(ASTM D1238) of from about 140 g/10 min to about 160 g/10 min; a Vicat softening temperature (ASTM D1525) of from about 40° C. to about 60° C.; a tensile strength at break (ASTM D638) of from about 1.5 MPa to about 3 MPa; an elongation at break (ASTM D638) of from about 500% to about 600%; and a flexural modulus 1% secant (ASTM D790) of from about 15 MPa to about 25 MPa.

Clause 31. The composition of any of Clauses 1 to 30, further including an additional material selected from the group consisting of a plasticizer, a stabilizer, an antioxidant, an ultraviolet ray absorber, an anti-static agent, a dyes, a pigment, an inorganic filler, a fire-retardant, a lubricant, a reinforcing agent, a processing aid, a slip additive, an antiblock agent, a release agent and mixture(s) thereof.

Clause 32. The composition of any of Clauses 1 to 31, wherein the composition has one or more of the following properties: an elongation at break, measured according to method ISO 37, of greater than about 150%; a Brookfield viscosity @177° C. of from about 500 cPs to about 2,000 cPs, according to ASTM D-3236; a fiber tear @25° C. of from about 50% to about 100%; a fiber tear @4° C. of from about 30% to about 100%; a fiber tear @−18° C. of from about 30% to about 100%; or a set time of from about 2.5 seconds or less, as determined by auto set time machine.

Clause 33. The composition of any of Clauses 1 to 32, wherein the composition has each of the following properties: an elongation at break, measured according to method ISO 37, of greater than about 150%; a Brookfield viscosity @177° C. of from about 500 cPs to about 1,200 cPs, according to ASTM D-3236; a fiber tear @25° C. of from about 90% to about 100%, a fiber tear @4° C. of from about 75% to about 90%, a fiber tear @−18° C. of from about 70% to about 95%; and a set time of from about 1.25 seconds to about 2.25 seconds, as determined by auto set time machine.

Clause 34. A composition comprising: from about 10 wt % to about 50 wt % of a polymer, based on the total weight of the composition; from about 20 wt % to about 70 wt % of a resin, based on the total weight of the composition; and from about 1 wt % to about 50 wt % of wax comprising an olefin wax, based on the total weight of the composition, wherein the total amount of polymer, resin, and wax does not exceed 100% of the composition.

Clause 35. The composition of Clause 34, wherein the olefin wax is a linear alpha olefin.

Clause 36. The composition of Clauses 34 or 35, wherein the olefin wax is selected from the group consisting of (1) an olefin having from about 20 carbon atoms to about 24 carbon atoms, (2) an olefin having from about 26 carbon atoms to about 28 carbon atoms, (3) an olefin having from about 26 to about 28 carbon atoms, (4) an olefin having from having at least about 30 carbon atoms, and (5) a combination thereof.

Clause 37. The composition of any of Clauses 34 to 36, wherein the olefin wax has each of the following properties: a congealing point of from about 45° C. to about 65° C., according to ASTM D938; a penetration @25° C. (0.1 mm, needle), according to ASTM D1321, of from about 15 to about 40; a density @80° C. of from about 700 kg/m3 to about 900 kg/m3, according to ASTM D4052; a kinematic viscosity @1000C of from about 3 mm2/s to about 6 mm2/s, according to ASTM D445; and a drop melting point of from about 15° C. to about 50° C. according to ASTM D3954.

Clause 38. The composition of any of Clauses 34 to 37, wherein the wax comprises a wax selected from the group consisting of a paraffin wax, a microcrystalline wax, a high-density low molecular weight polyethylene wax, a by-product polyethylene wax, a Fischer-Tropsch wax, an oxidized Fischer-Tropsch wax, and a functionalized wax.

Clause 39. The composition of any of Clauses 34 to 38, wherein the wax comprises a wax having each of the following properties: a drop melting point (ASTM D3954) of from about 90° C. to about 130° C.; a penetration @25° C. (needle, 0.1 mm), according to ASTM D1321, of from about 0.1 to about 10; a penetration @65° C. (needle, 0.1 mm), according to ASTM D1321, of from about 10 to about 40; and a molecular weight (Mw by gel permeation chromatography) of from about 700 g/mol to about 1,000 g/mol.

Clause 40. The composition of any of Clauses 34 to 39, wherein the wax comprises a wax having each of the following properties: a drop melting point of from about 55° C. to about 75° C., according to ASTM D3954; penetration @25° C. (needle, 0.1 mm), according to ASTM D1321, of from about 8 to about 20; penetration @40° C. (needle, 0.1 mm), according to ASTM D1321, of from about 20 to about 50; kinematic viscosity @1000C of from about 1 cSt to about 10 cSt, according to ASTM D 445; and density @15° C. of from about 700 kg/m3 to about 1,000 kg/m3, according to ASTM D 1298.

Clause 41. The composition of any of Clauses 34 to 40, wherein the polymer is selected from the group consisting of ethylene vinyl acetate, polyethylene, polypropylene, thermoplastic rubber, polyamide, polyurethane, polyester, and a mixture thereof.

Clause 42. The composition of any of Clauses 34 to 41, wherein the resin is selected from the group consisting of a coumarone-indene resin, a terpene resin, a butadiene-styrene resin, a rosin, a thermoplastic hydrocarbon resin, and a mixture thereof.

Clause 43. A composition comprising: from about 10 wt % to about 50 wt % of a polymer, based on the total weight of the composition; from about 20 wt % to about 70 wt % of a resin, based on the total weight of the composition; and from about 1 wt % to about 50 wt % of a wax blend comprising (a) an olefin wax and (b) an additional wax, based on the total weight of the composition, wherein the total amount of polymer, resin, and wax does not exceed 100% of the composition.

Clause 44. The composition of Clause 43, wherein the additional wax is selected from the group consisting of a paraffin wax, a microcrystalline wax, a high-density low molecular weight polyethylene wax, a by-product polyethylene wax, a Fischer-Tropsch wax, an oxidized Fischer-Tropsch wax, a functionalized wax and combinations thereof.

Clause 45. The composition of Clause 43, wherein the additional wax is a paraffin wax.

Clause 46. The composition of Clause 43, wherein the olefin wax is a linear alpha olefin.

Clause 47. The composition of Clause 43, wherein the olefin wax is selected from the group consisting of (1) an olefin having from about 20 carbon atoms to about 24 carbon atoms, (2) an olefin having from about 26 carbon atoms to about 28 carbon atoms, (3) an olefin having from about 26 to about 28 carbon atoms, (4) an olefin having from having at least about 30 carbon atoms, and (5) combinations thereof.

Clause 48. The composition of Clause 43, wherein the olefin wax has each of the following properties: a congealing point of from about 45° C. to about 65° C., according to ASTM D938; a penetration @25° C. (0.1 mm, needle), according to ASTM D1321, of from about 15 to about 40; a density @80° C. of from about 700 kg/m3 to about 900 kg/m3, according to ASTM D4052; a kinematic viscosity @1000C of from about 3 mm2/s to about 6 mm2/s, according to ASTM D445; and a drop melting point of from about 15° C. to about 50° C. according to ASTM D3954.

Clause 49. The composition of Clause 43, wherein the wax comprises a wax having each of the following properties: a drop melting point (ASTM D3954) of from about 90° C. to about 130° C.; a penetration @25° C. (needle, 0.1 mm), according to ASTM D1321, of from about 0.1 to about 10; a penetration @65° C. (needle, 0.1 mm), according to ASTM D1321, of from about 10 to about 40; and a molecular weight (Mw by gel permeation chromatography) of from about 700 g/mol to about 1,000 g/mol.

Clause 50. The composition of Clause 43, wherein the wax comprises a wax having each of the following properties: a drop melting point of from about 55° C. to about 75° C., according to ASTM D3954; penetration @25° C. (needle, 0.1 mm), according to ASTM D1321, of from about 8 to about 20; penetration @40° C. (needle, 0.1 mm), according to ASTM D1321, of from about 20 to about 50; kinematic viscosity @1000C of from about 1 cSt to about 10 cSt, according to ASTM D 445; and density @15° C. of from about 700 kg/m3 to about 1,000 kg/m3, according to ASTM D 1298.

Clause 51. An article comprising: a composition disposed thereon, the composition comprising: a polymer; a resin; and an olefin wax.

Clause 52. The article of Clause 51, wherein the article is selected from the group consisting of a carton, a container, a crate, a case, a corrugated case, or a tray.

Clause 53. The article of Clauses 51 or 52, wherein the article is selected from the group consisting of furniture, a toy, a musical instrument, a window frame, a sill, a door, flooring, fencing, a tool, a ladders, a sporting good, a dog house, a gazebo, a deck, or a picnic table.

Clause 54. An article comprising: a composition disposed thereon, the composition comprising: from about 10 wt % to about 50 wt % of a polymer, based on the total weight of the composition; from about 20 wt % to about 70 wt % of a resin, based on the total weight of the composition; and from about 1 wt % to about 50 wt % of wax comprising an olefin wax, based on the total weight of the composition, wherein the total amount of polymer, resin, and wax does not exceed 100% of the composition.

Clause 55. The article of Clause 54, wherein the article is selected from the group consisting of a carton, a container, a crate, a case, a corrugated case, or a tray.

Clause 56. The article of Clauses 54 or 55, wherein the article is selected from the group consisting of furniture, a toy, a musical instrument, a window frame, a sill, a door, flooring, fencing, a tool, a ladders, a sporting good, a dog house, a gazebo, a deck, or a picnic table.

Clause 57. A method of making a composition, comprising: mixing a polymer, a resin, and an olefin wax to form the composition.

Clause 58. The method of Clause 57, wherein mixing is performed by dry blending or extruding the polymer, the resin, and the olefin wax to form the composition.

Clause 59. The method of Clauses 57 or 58, wherein mixing is performed at a temperature of from about 130° C. to about 210° C.

Clause 60. A method comprising: applying a hot melt adhesive comprising an olefin wax to a first article to form an article having the hot melt adhesive disposed thereon; and applying a second article to the article having the hot melt adhesive disposed thereon.

Clause 61. The method of Clause 60, wherein the hot melt adhesive further comprises a polymer or a resin.

Clause 62. The method of Clauses 60 or 61, wherein the hot melt adhesive further comprises a polymer and a resin.

EXAMPLES

Adhesives were formed by the following procedure: (1) each component for the adhesive was weighed, (2) all components for the particular formulation were placed in either a glass beaker or a metal paint can at room temperature, (3) the container was placed in an oven—temperature can vary based on the ingredients but was typically 230° C., (4) the components were allowed to melt, (5) the container was removed from the oven and placed in a heating mantel and a stir blade was added, (6) the stir blade motor (essentially a drill press) was turned on and the sample was mixed until it was homogeneous, (7) the samples were poured out into shallow trays (the tray was made from release paper so the adhesive would not stick to it), (8) the sample was allowed to cool to form the adhesive blend, (9) lastly, portions of the adhesive blend that had been formed were broken off and the various tests (fiber tear, viscosity, etc) were performed.

"Fiber tear" describes the bond strength of the adhesive to the substrate and was measured at 25° C., 4° C., and −18° C. Fiber tear is a visual measurement as to the amount of paper substrate fibers that are attached to a bond after the substrates are torn apart. 100% fiber tear means the adhesive is stronger than the substrate and 100% of the adhesive is covered in substrate fibers. 0% fiber tear means the adhesive does not bond at all and simply pops off the substrate. Fiber tear was determined by bonding together substrates with the adhesive. A drop of molten adhesive (180° C.) was positioned on one of the substrates with an eye dropper. The second substrate was placed on top of the adhesive, and a 500 g weight was placed on top of the second substrate for even application. The adhesive was cooled at the referenced temperature for at least one hour. The substrates were then torn apart and the adhesive was inspected for fiber tear.

"Set time" is defined as the minimal holding time to build bond cohesion requiring more than 10 kg force to break the bond. Set time was determined by bonding together substrates with the adhesive after the molten adhesive (180° C.) has been dropped onto one of the substrates with an eye dropper, The second substrate was placed on top of the adhesive, and a 500 g weight was placed on top of the second substrate for even application. After a predetermined interval of time the second substrate is removed and checked for fiber tear. If no fiber tear was found, a longer interval of time was tried. This continued until fiber tear is found. This length of time was reported as the set time.

Dow AFFINITY™ GA 1950 is a polyolefin plastomer available from E.I. du Pont de Nemours and Company (DuPont), Wilmington, Del. Dow AFFINITY™ GA 1950 has a density of 0.874 g/cc (ASTM D792), Brookfield Viscosity of 17,000 cPs (ASTM D1084), tensile strength of 1.76 MPa (ASTM D638), elongation at break of 185% (ASTM D638), melting point of 70° C. (Dow Method), and a glass transition temperature (Tg) of −57.0° C. (Dow Method).

Commercial Olefin Wax 1 was obtained from Shell Chemicals LP of Houston, TX. Commercial Olefin Wax 1 has a dynamic viscosity of 10 cPs @37.8° C., a melting point of 30° C., and a density of about 792 kg/m³ @30° C.

Commercial Olefin Wax 2 was obtained from Shell Chemicals LP of Houston, TX. Commercial Olefin Wax 2 has a density @80° C. of 777 kg/m³ (ASTM D4052), and a viscosity @100° C. of 4.25 mm²/s (ASTM D445).

TABLE 1 illustrates data obtained for inventive adhesive compositions and comparative adhesive compositions.

| Material | Lot # | 1 % | 2 % | 3 % | 4 % | 5 % | 6 % |
|---|---|---|---|---|---|---|---|
| Commercial Olefin Wax 1 | E17747-02-A | 100 | | 2.0 | 4.0 | | |
| Commercial Olefin Wax 2 | 200431-0193 | | 100 | | | 2.0 | 4.0 |
| PARVAN 1470 | WB16-210 | | | | | | |
| SasolWax H1 | 1608W09005 | | | | | | |
| Escorene UL 7710 | 116082504A | | | 98 | 96 | 98 | 96 |
| Escorene UL 7720 | N/A | | | | | | |
| Affinity 1950 | ZD1401E142 | | | | | | |
| Escorez E5400 | N160906C02 | | | | | | |
| Escorez E5615 | N160216C03 | | | | | | |
| Irganox 1010 | Y1815H231 | | | | | | |

| Property | Unit | 1 | 2 | 3 | 4 | 5 | 6 |
|---|---|---|---|---|---|---|---|
| Viscosity @ 177° C., Initial | cps | | | 19680 | 16930 | 20220 | 17750 |

| Material | Lot # | P (EVA) % | S (EVA) % | P (Dow) % | S (Dow) % |
|---|---|---|---|---|---|
| Commercial Olefin Wax 1 | E17747-02-A | | | | |
| Commercial Olefin Wax 2 | 200431-0193 | | | | |
| PARVAN 1470 | WB16-210 | 25 | | 25 | |
| SasolWax H1 | 1608W09005 | | 25 | | 25 |
| Escorene UL 7710 | 116082504A | | | | |
| Escorene UL 7720 | N/A | 40 | 40 | | |
| Affinity 1950 | ZD1401E142 | | | 40 | 40 |
| Escorez E5400 | N160906C02 | | | | |
| Escorez E5615 | N160216C03 | 34.8 | 34.8 | 34.8 | 34.8 |
| Irganox 1010 | Y1815H231 | 0.2 | 0.2 | 0.2 | 0.2 |

| Property | Unit | P (EVA) | S (EVA) | P (Dow) | S (Dow) |
|---|---|---|---|---|---|
| Viscosity @ 177° C., Initial | cps | 1455 | 1940 | 773 | 1008 |
| Fiber Tear @ -18° C., 4° C., 25° C. | | | | | |
| Fiber Tear @ 25° C. (Room) | % | 96 | 78 | 100 | 78 |
| Fiber Tear @ 4° C. (Refrig) | % | 94 | 78 | 100 | 60 |
| Fiber Tear @ -18° C. (Freezer) | % | 94 | 70 | 96 | 16 |
| Set time | s | 3.3 | 2.0 | 2.3 | 1.7 |

| Material | Lot # | 7 % | 8 % | 9 % | 10 % | 11 % | 12 % | 13 % | 14 % |
|---|---|---|---|---|---|---|---|---|---|
| Commercial Olefin Wax 1 | E17747-02-A | 15 | | | | | | | |
| Commercial Olefin Wax 2 | 200431-0193 | | 15 | | 10 | 10 | | 10 | 10 |
| PARVAN 1470 | WB16-210 | | | 10 | 10 | | 10 | 10 | |
| SasolWax H1 | 1608W09005 | | | 10 | | 10 | 10 | | 10 |
| Escorene UL 7710 | 116082504A | 35 | 35 | 40 | 40 | 40 | | | |
| Escorene UL 7720 | N/A | | | | | | | | |
| Affinity 1950 | ZD1401E142 | | | | | | 40 | 40 | 40 |
| Escorez E5400 | N160906C02 | 49 | 49 | | | | | | |

TABLE 1-continued illustrates data obtained for inventive adhesive compositions and comparative adhesive compositions.

| | | | | | | | | | |
|---|---|---|---|---|---|---|---|---|---|
| Escorez E5615 | N160216 C03 | | | 39.5 | 39.5 | 39.5 | 39.5 | 39.5 | 39.5 |
| Irganox 1010 | Y1815H 231 | 1.0 | 1.0 | 0.5 | 0.5 | 0.5 | 0.5 | 0.5 | 0.5 |
| Property | Unit | 7 | 8 | 9 | 10 | 11 | 12 | 13 | 14 |
| Viscosity @ 177° C., Initial | cps | 568 | 645 | 945 | 835 | 940 | 1130 | 1008 | 1120 |
| Fiber Tear @ -18° C., 4° C., 25° C. | | | | | | | | | |
| - Fiber Tear @ 25° C. (Room) | % | 83 | 90 | 96 | 100 | 98 | 98 | 100 | 98 |
| Fiber Tear @ 4° C. (Refrig) | % | 40 | 76 | 86 | 100 | 88 | 92 | 98 | 84 |
| Fiber Tear @ −18° C. (Freezer) | % | 56 | 51 | 74 | 94 | 86 | 92 | 98 | 72 |
| Set time | s | >5 | 5.0 | 2.3 | 3.0 | 2.3 | 2.0 | 4.5 | 3.0 |

It is typically difficult to form a blend that has low viscosity and fast set time and good fiber tear adhesion in the freezer. As shown in Table 1, blends 11 and 12 provide low viscosity, fast set time, and good fiber tear, and are better than the comparatives.

In addition, for woodworking and product assembly applications, fast set time is not desired because wooden objects are being glued together, and occasional repositioning of the objects may be needed before the adhesive sets. Thus, blends 7-8 and 13 illustrate very long set times which would be suitable for woodworking applications.

Overall, compositions of the present disclosure including an olefin wax, such as a linear alpha olefin, can provide a composition having increased fiber tear while maintaining low viscosity during set time. Compositions of the present disclosure may be advantageously used as hot melt adhesives.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of" "consisting of," "selected from the group of consisting of," or "is" preceding the recitation of the composition, element, or elements and vice versa.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

What is claimed is:

1. A composition comprising:
a polymer;
a resin;
an olefin wax having:
  (i) an olefin content of from about 2% to about 4%, based on olefinic carbon atoms divided by total carbon atoms of the olefin wax as determined by $^{13}$C NMR, and
  (ii) a penetration @25° C. (0.1 mm, needle), of from about 15 to about 40, according to ASTM D1321;
a Fischer-Tropsch wax; and
a paraffin wax having an oil content of less than about 0.5 wt. %.

2. The composition of claim 1, wherein the composition comprises:
from about 10 wt % to about 50 wt % of the polymer, based on the total weight of the composition; from about 20 wt % to about 70 wt % of the resin, based on the total weight of the composition; and from about 1 wt % to about 50 wt % of wax, based on the total weight of the composition.

3. The composition of claim 1, wherein the composition comprises:
from about 25 wt % to about 30 wt % of the polymer, based on the total weight of the composition; from about 35 wt % to about 50 wt % of the resin, based on the total weight of the composition; and from about 15 wt % to about 30 wt % of wax, based on the total weight of the composition.

4. The composition of claim 1, wherein the olefin wax is a linear alpha olefin.

5. The composition of claim 1, wherein the olefin wax has from about 20 carbon atoms to about 50 carbon atoms.

6. The composition of claim 1, wherein the olefin wax is selected from the group consisting of (1) an olefin having from about 20 carbon atoms to about 24 carbon atoms, (2) an olefin having from about 26 carbon atoms to about 28 carbon atoms, (3) an olefin having from about 26 to about 28 carbon atoms, (4) an olefin having from having at least 30 carbon atoms, and (5) combination(s) thereof.

7. The composition of claim 1, wherein the olefin wax has one or more of the following properties: a congealing point of from about 45° C. to about 65° C., according to ASTM D938; a density @80° C. of from about 700 kg/m3 to about 900 kg/m3, according to ASTM D4052; a kinematic viscosity @100° C. of from about 3 mm2/s to about 6 mm2/s, according to ASTM D445; or a drop melting point of from about 15° C. to about 50° C. according to ASTM D3954.

8. The composition of claim 1, wherein the olefin wax has each of the following properties: a congealing point of from about 55° C. to about 60° C., according to ASTM D938; a penetration @25° C. (0.1 mm, needle), according to ASTM D1321, of from about 15 to about 40, such as from about 20 to about 30, such as from about 22 to about 26; a density @80° C. of from about 750 kg/m3 to about 800 kg/m3, according to ASTM D4052; a kinematic viscosity @100° C. of from about 4 mm2/s to about 4.5 mm2/s, according to ASTM D445; and a drop melting point of from about 30° C. to about 35° C. according to ASTM D3954.

9. The composition of claim 1, wherein the composition includes greater than 30 mol % olefin wax having at least 20 carbon atoms, based on the total amount of wax in the composition.

10. The composition of claim 1, wherein the composition includes greater than 90 mol % olefin wax having at least 20 carbon atoms, based on the total amount of wax in the composition.

11. The composition of claim 1, wherein the a Fischer-Tropsch wax has one or more of the following properties: a drop melting point (ASTM D3954) of from about 90° C. to about 130° C.; penetration @25° C. (needle, 0.1 mm) (ASTM D 1321) of from about 0.1 to about 10; penetration @65° C. (needle, 0.1 mm) (ASTM D 1321) of from about 10 to about 40; or a molecular weight (Mw by gel permeation chromatography) of from about 700 g/mole to about 1,000 g/mole.

12. The composition of claim 1, wherein the a Fischer-Tropsch wax has each of the following properties: a drop melting point (ASTM D3954) of from 110° C. to about 115° C., penetration @25° C. (needle, 0.1 mm) (ASTM D 1321) of from about 0.5 to about 1.5; penetration @65° C. (needle, 0.1 mm) (ASTM D 1321) of from about 15 to about 25; and a molecular weight (Mw by gel permeation chromatography) of from about 800 g/mole to about 900 g/mole.

13. The composition of claim 1, wherein the resin has a softening point (Ring and Ball, as measured by ASTM E-28) of from about 100° C. to about 130° C.

14. The composition of claim 1, wherein the resin has a softening point (Ring and Ball, as measured by ASTM E-28) of from about 10° C. and about 70° C.

15. The composition of claim 1, wherein the resin is a coumarone-indene resin.

16. The composition of claim 1, wherein the resin is a terpene resin, a butadiene-styrene resin, a rosin, or a thermoplastic hydrocarbon resin, or a combination thereof.

17. The composition of claim 1, wherein the polymer is ethylene vinyl acetate, polyethylene, polypropylene, thermoplastic rubber, polyamide, polyurethane, or polyester, or a combination thereof.

18. The composition of claim 1, wherein the polymer is an ethylene vinyl acetate having a vinyl acetate content from about 12 wt % to about 32 wt %.

19. The composition of claim 18, wherein the ethylene vinyl acetate has one or more of the following properties: a density (ASTM D1505) of from about 0.92 g/cm3 to about 0.96 g/cm3; a melt index (190° C./2.16 kg) (ASTM D1238) of from about 100 g/10 min to about 200 g/10 min; a Vicat softening temperature (ASTM D1525) of from about 30° C. to about 70° C.; a tensile strength at break (ASTM D638) of from about 0.1 MPa to about 6 MPa; an elongation at break (ASTM D638) of from about 400% to about 700%; or a flexural modulus 1% secant (ASTM D790) of from about 10 MPa to about 30 MPa.

20. The composition of claim 18, wherein the ethylene vinyl acetate has each of the following properties: a density (ASTM D1505) of from about 0.94 g/cm3 to about 0.95 g/cm3; a melt index (190° C./2.16 kg) (ASTM D1238) of from about 140 g/10 min to about 160 g/10 min; a Vicat softening temperature (ASTM D1525) of from about 40° C. to about 60° C.; a tensile strength at break (ASTM D638) of from about 1.5 MPa to about 3 MPa; an elongation at break (ASTM D638) of from about 500% to about 600%; and a flexural modulus 1% secant (ASTM D790) of from about 15 MPa to about 25 MPa.

21. The composition of claim 1, further including an additional material selected from the group consisting of a plasticizer, a stabilizer, an antioxidant, an ultraviolet ray absorber, an anti-static agent, a dyes, a pigment, an inorganic filler, a fire-retardant, a lubricant, a reinforcing agent, a processing aid, a slip additive, an antiblock agent, a release agent and mixture(s) thereof.

22. The composition of claim 1, wherein the composition has one or more of the following properties: an elongation at break, measured according to method ISO 37, of greater than about 150%; a Brookfield viscosity @177° C. of from about 500 cPs to about 2,000 cPs, according to ASTM D-3236; a fiber tear @25° C. of from about 50% to about 100%; a fiber tear @4° C. of from about 30% to about 100%; a fiber tear @–18° C. of from about 30% to about 100%; or a set time of from about 2.5 seconds or less, as determined by auto set time machine.

23. The composition of claim 1, wherein the composition has each of the following properties: an elongation at break, measured according to method ISO 37, of greater than about 150%; a Brookfield viscosity @177° C. of from about 500 cPs to about 1,200 cPs, according to ASTM D-3236; a fiber tear @25° C. of from about 90% to about 100%, a fiber tear @4° C. of from about 75% to about 90%, a fiber tear @–18° C. of from about 70% to about 95%; and a set time of from about 1.25 seconds to about 2.25 seconds, as determined by auto set time machine.

24. The composition of claim 1, further comprising an additional wax selected from the group consisting of a microcrystalline wax, a high-density low molecular weight polyethylene wax, a by-product polyethylene wax, an oxidized Fischer-Tropsch wax, a functionalized wax, and combinations thereof.

25. An article comprising the composition of claim 1.

26. The article of claim 25, wherein the article is a carton, a container, a crate, a case, a corrugated case, a tray, furniture, a toy, a musical instrument, a window frame, a sill, a door, flooring, fencing, a tool, a ladder, a sporting good, a dog house, a gazebo, a deck, a picnic table or a combination thereof.

27. The composition of claim 1 wherein the resin comprises less than 0.5 wt. % of monomers having polar groups.

\* \* \* \* \*